United States Patent
Adams

(10) Patent No.: US 9,556,073 B2
(45) Date of Patent: Jan. 31, 2017

(54) PROCESS FOR SINTERING SILICON CARBIDE

(71) Applicant: Dale Adams, Kent, OH (US)

(72) Inventor: Dale Adams, Kent, OH (US)

( * ) Notice: Subject to any disclaimer, the term of this patent is extended or adjusted under 35 U.S.C. 154(b) by 0 days.

(21) Appl. No.: 15/141,136

(22) Filed: Apr. 28, 2016

(65) Prior Publication Data

US 2016/0236991 A1 Aug. 18, 2016

Related U.S. Application Data

(63) Continuation-in-part of application No. 14/321,215, filed on Jul. 1, 2014, now Pat. No. 9,353,014.

(Continued)

(51) Int. Cl.
*C04B 35/565* (2006.01)
*C04B 35/575* (2006.01)
(Continued)

(52) U.S. Cl.
CPC ............. *C04B 35/645* (2013.01); *C01B 31/36* (2013.01); *C04B 35/575* (2013.01); *C04B 35/624* (2013.01); *C04B 35/634* (2013.01); *C04B 35/638* (2013.01); *C04B 35/64* (2013.01); *C04B 38/00* (2013.01); *C04B 40/0007* (2013.01);
(Continued)

(58) Field of Classification Search
CPC .. C04B 35/575; C04B 35/565; C04B 35/6455; C04B 2235/6023
See application file for complete search history.

(56) References Cited

U.S. PATENT DOCUMENTS

| RE28,301 E * | 1/1975 | Havel ................... B22F 3/1225 264/125 |
| 4,108,652 A * | 8/1978 | Ogawa ................. B22F 3/1266 264/125 |

(Continued)

FOREIGN PATENT DOCUMENTS

| CN | 101200373 A | 6/2008 |
| DE | 102011016468 | 2/2012 |

(Continued)

OTHER PUBLICATIONS

International Search Report and Written Opinion for International Application No. PCT/US2014/045083, mailed Oct. 9, 2014.

(Continued)

*Primary Examiner* — Erin Snelting
(74) *Attorney, Agent, or Firm* — Roger D. Emerson; Emerson, Thomson & Bennett, LLC

(57) ABSTRACT

A process for sintering silicon carbide is provided which includes the steps of providing a silicon carbide powder of silicon carbide granules; purifying the silicon carbide powder; subjecting the purified silicon carbide powder to a gel-casting process; removing the gel-cast part from the mold; drying the gel-cast part; obtaining a dried cast ceramic part (a green body) which is capable of green machining into a final desired shape; firing the green body in an oven at temperatures ranging from about 100° C. to about 1900° C. to remove or burn out any polymer remaining in the ceramic; and sintering the green body at temperatures ranging from about 1600° C. to less than about 2200° C.

21 Claims, 23 Drawing Sheets

Related U.S. Application Data

(60) Provisional application No. 61/841,614, filed on Jul. 1, 2013.

(51) Int. Cl.

| | |
|---|---|
| *C04B 35/645* | (2006.01) |
| *C01B 31/36* | (2006.01) |
| *C04B 40/00* | (2006.01) |
| *C04B 35/624* | (2006.01) |
| *C04B 35/634* | (2006.01) |
| *C04B 35/638* | (2006.01) |
| *C04B 35/64* | (2006.01) |
| *C04B 38/00* | (2006.01) |

(52) U.S. Cl.
CPC .... *C04B 40/0021* (2013.01); *C04B 2235/606* (2013.01); *C04B 2235/6023* (2013.01); *C04B 2235/6587* (2013.01); *C04B 2235/72* (2013.01)

(56) References Cited

U.S. PATENT DOCUMENTS

| | | | | |
|---|---|---|---|---|
| 4,894,194 A | * | 1/1990 | Janney | C03B 19/12 264/109 |
| 5,049,329 A | * | 9/1991 | Allaire | C03B 11/14 264/332 |
| 5,051,218 A | * | 9/1991 | Matthews | B22F 3/1225 264/125 |
| 5,322,824 A | * | 6/1994 | Chia | C04B 35/565 252/516 |
| 6,001,756 A | * | 12/1999 | Takahashi | C04B 35/575 264/604 |
| 8,316,969 B1 | | 11/2012 | Bertagnolli et al. | |
| 8,420,515 B2 | * | 4/2013 | Carberry | B29C 35/0805 438/497 |
| 9,353,014 B2 | * | 5/2016 | Adams | C01B 31/36 |
| 2003/0190275 A1 | * | 10/2003 | Miyazawa | B28B 1/14 423/330.1 |
| 2006/0280640 A1 | * | 12/2006 | Schlesser | C22C 1/045 419/14 |
| 2010/0183495 A1 | * | 7/2010 | Schumacher | C03C 12/00 423/335 |
| 2013/0048390 A1 | | 2/2013 | Bertagnolli et al. | |

FOREIGN PATENT DOCUMENTS

| | | |
|---|---|---|
| EP | 0626358 A2 | 11/1994 |
| JP | 11011923 A * | 1/1999 |
| JP | 1437847 | 3/2010 |
| WO | 2013045251 | 4/2013 |

OTHER PUBLICATIONS

International Preliminary Report on Patentability for International Application No. PCT/US2014/045083, mailed Jan. 5, 2016.

* cited by examiner

PROCESS FOR SINTERING SILICON CARBIDE

This application claims the benefit of priority under 35 U.S.C. §120 of U.S. patent application Ser. No. 14/321,215 which, in turn, claims the benefit of 35 U.S.C. §119(e) of U.S. Provisional Patent Application Ser. No. 61/841,614, filed Jul. 1, 2013, the disclosures of which are herein incorporated by reference in its entireties.

TECHNICAL FIELD

The subject disclosure relates to methods and machine systems used in the sintering of silicon carbide and other ceramics.

BACKGROUND

Although conventional ceramic production techniques date to the Sumerians, rudimentary efforts to harden natural raw materials nearly 5000 years ago, the $20^{th}$ Century witnessed the emergence of a new kind of ceramics. Today, advances in machinery permit the creation of "engineering ceramics" which are advanced products formed by using high temperatures to harden inorganic nonmetallic compounds such as oxides, nitrides, borides, carbides, silicides, and sulfides into materials with extraordinary properties. Some engineered ceramics exhibit extreme heat resistance, with melting temperatures as high as 4000° F. and sulfides into materials with extraordinary properties. Additionally, engineered ceramics are exceptionally hard; cubic boron, for example, is almost as hard as diamond. Finally, engineered ceramics are lightweight, intrinsically strong, and resistant to corrosive chemicals. In short, engineered ceramics are in high demand in the energy, aviation, and automobile industries, where high gas prices and environmental concerns are motivating engineers to create engines and power plants that can operate at very high temperatures while consuming less fuel.

An advanced process for forming ceramics known as "gelcasting", developed by the Oak Ridge National Laboratory (ORNL) during the 1980's was an important first step in the creation of high-quality, complex-shaped engineering ceramic parts, and has become a widely used process in ceramics engineering with advantages over traditional methods such as slip casting, pressure casting, die pressing, extrusion, and injection molding. Put simply, traditional casting processes are expensive and produce parts with a high rate of defects. Injection molding, for example, begins with the mixing of a ceramic powder with a polymer or other binder to form a very thick liquid that is subsequently forced, or injected, into a mold under very high temperatures and pressures (and at great expense). Other processes, such as slip casting, did not produce parts that shrink uniformly in the firing process, thereby producing inferior parts. Additionally, in all traditional casting processes, defects in sintered parts necessitate expensive machining—using diamond tools to cut, shape, and finish the parts—before the product is capable of use.

Gelcasting, in contrast, mixes a powder with a gel precursor mix (typically including a multifunctional acrylate, such as the monomers acrylamide or methacrylamide) to create a ceramic slurry that can be poured—instead of injected under high pressure and temperature—into a mold. The use of monomers, instead of polymers, lets engineers load high amounts of solids into a slurry that, once dried in the mold, produces a gel that is strong enough to resist crumbling while soft enough to be manipulated in its "green body" phase without the use of expensive diamond cutting tools in the machining process. Once the gel is fired, or sintered, a gelcast product can take on intricate mold characteristics in producing very strong and heat resistant parts.

Unfortunately, even gelcast engineered ceramics can be brittle and continue to face obstacles in obtaining a low cost manufacturing method. In particular, the high temperatures and pressures needed to sinter—firing a powder or other mass of fine particles at high temperatures to create a hardened product—ceramics are presently cost-prohibitive, unsafe, and ineffective in providing reliably strong parts. Moreover, specific inorganic materials, such as silicon carbide, are prone to corrosive buildups and have granular shapes that inhibit the sintering process. The sintering of silicon carbide is presently only capable of being affected by hot press sintering; however, even hot press sintered silicon carbide has yet to reach a sufficiently satisfactory theoretical density. There is a need in the art of the sintering process that utilizes affordable machinery, streamlined processes, and produces part shapes that are not hot pressed.

The present disclosure solves these problems, as further detailed below, by commencing operations with a ceramic powder free of the corrosive buildups that normally inhibit the sintering process. Sintering operations are further improved by the application of vibrations—at critical process stages—to produce a compacted work product of superior hardness and strength. Finally, the improved processes described herein can be carried out with less expensive, more reliable, and dramatically safer induction heating crucibles.

SUMMARY

Provided is a process for sintering silicon carbide which includes the steps of providing a silicon carbide powder of silicon carbide granules; purifying the silicon carbide powder by washing the silicon carbide powder with a solution of hydrofluoric acid, rinsing the silicon carbide powder in distilled water, and drying the silicon carbide powder to obtain a pure silicon carbide powder, wherein granules which form the silicon carbide powder are substantially free of a silicon dioxide shell; and subjecting the purified silicon carbide powder to a gel-casting process comprising the steps of mixing the silicon carbide powder with water or a non-aqueous solvent, a dispersant, and gel-forming organic monomers to obtain a ceramic slurry; exposing the ceramic slurry to a partial vacuum to remove air from the ceramic slurry; adding a polymerization initiator to the ceramic slurry to commence the gel-forming chemical reaction; pouring the ceramic slurry into molds to cast the ceramic slurry into the desired workpiece shape; and heating the mold in a curing oven or setting the mold with a catalyst; removing the gel-cast part from the mold; drying the gel-cast part under conditions of relatively high humidity to remove a substantial portion of the solvent and obtain a dried cast ceramic part known as a green body which is capable of green machining into a final desired shape; firing the green body in an oven at temperatures ranging from about 100° C. to about 1600° C. to remove or burn out any polymer remaining in the ceramic; and sintering the green body at temperatures ranging from about 1600° C. to less than about 2200° C., wherein the green body is sintered within a capped crucible of molten liquid under conditions of high pressure, wherein the pressure is obtained by capping of the crucible and application of vibratory forces to the molten liquid.

Further provided is a process for sintering silicon carbide which includes the steps of providing a silicon carbide powder of silicon carbide granules; purifying the silicon carbide powder by 1.) washing the silicon carbide powder with a solution of hydrofluoric acid, 2.) rinsing the silicon carbide powder in distilled water; and 3.) drying the silicon carbide powder to obtain a pure silicon carbide powder, wherein granules which form the silicon carbide powder are substantially free of a silicon dioxide shell; and subjecting the purified silicon carbide powder to a gel-casting process. The gel-casting process includes the steps of mixing the silicon carbide powder with water or a non-aqueous solvent, a dispersant, and gel-forming organic monomers to obtain a ceramic slurry; exposing the ceramic slurry to a partial vacuum to remove air from the ceramic slurry; 3) adding a polymerization initiator to the ceramic slurry to commence a gel-forming chemical reaction; 4) pouring the ceramic slurry into a mold and casting the ceramic slurry into a desired workpiece shape; and 5) heating the mold in a curing oven or setting the mold with a catalyst; removing a gel-cast part from the mold; drying the gel-cast part to remove the water or the non-aqueous solvent and obtain a dried cast ceramic part; placing the dried cast ceramic part in a chamber of a graphite crucible, wherein the graphite crucible is coated with investment ceramic, wherein the dried cast ceramic part is suspended within the crucible in fluorite powder that is packed and vibrated to compact the powder around the dried cast ceramic part, and wherein the graphite crucible is capped to contain the fluorite powder and eliminate air from the chamber; placing the graphite crucible in an oven heated to about 1000° F. and feeding an air bleed into the capped graphite crucible; maintaining the applied heat to the graphite crucible until oxygen precipitates through the fluorite powder and the silicon carbide is suspended in the fluorite media; i.) heating the graphite crucible to a temperature below 1450° C. to sinter the silicon carbide while it is held in situ by the fluorite powder, wherein the dried cast ceramic part is sintered within a capped crucible of pressurized molten liquid, wherein the pressure is obtained by capping of the crucible and application of vibratory forces to the molten liquid; firing the dried cast ceramic part in an oven at temperatures ranging from about 100° C. to about 1600° C. to remove or burn out any polymer remaining in the ceramic; and sintering the dried cast ceramic part at temperatures from about 1600° C. to less than about 2200° C., wherein the dried cast ceramic part is sintered within the pressurized capped crucible of molten liquid and wherein vibratory forces are applied to the molten liquid.

BRIEF DESCRIPTION OF THE DRAWINGS

The disclosed process may take physical form in certain parts and arrangement of parts, embodiments of which will be described in detail in this specification and illustrated in the accompanying drawings which form a part hereof and wherein.

DETAILED DESCRIPTION

Figure 1:
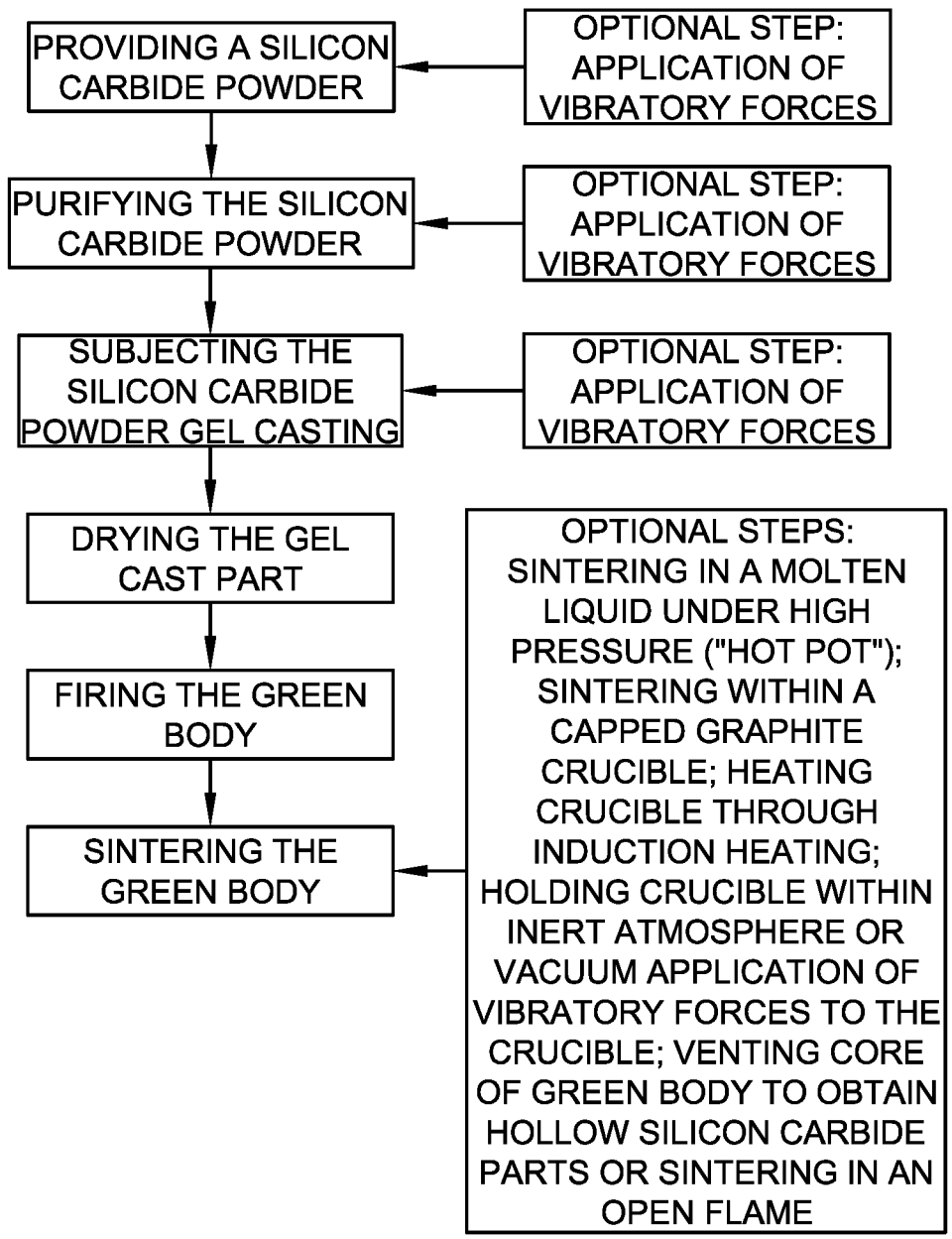
FIG. 1 is a flow chart of the steps of various embodiments of a process for sintering silicon carbide.

Representative applications of methods and apparatuses according to the present disclosure are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting. Although these embodiments are described in sufficient detail to enable one skilled in the art to practice the described embodiments, it is understood that these examples are not limiting; such that other embodiments may be used, and changes may be made without departing from the spirit and scope of the described embodiments.

According to one embodiment of the present disclosure, a process for sintering silicon carbide includes, at least, some arrangement of one or more of the following steps. The first step of the inventive process is to provide a silicon carbide powder, or grain, that is substantially free of a silicon dioxide shell. It is known in the art that during the manufacturing process of silicon carbide, the atmosphere reacts to produce a thin layer of silicon dioxide on the grain's outer surface. Greatly simplified, sintering involves application of high temperatures to prompt the exchange of atoms in the powder particles through diffusion across the boundaries of the particles, thus fusing the particles together to create a single solid piece. The layer of silicon dioxide typically found on silicon carbide granules is an impediment to the sintering process because it acts as an insulator which impedes the diffusion of atoms across particle boundaries inhibiting silicon carbide from fusing to itself. This silicon dioxide layer also plays a role in the high zeta potential inherently present within silicon carbide.

The traditional method for removing silicon dioxide deposits included lengthy ball milling cycles, typically ranging from 30-40 hours in duration, during which the granules are washed in water or alcohol until the outer shell is eventually chipped away. The first step of the present disclosure, however, replaces the expensive and ineffective ball-milling method with a simple washing process, well known to persons of skill in the art, wherein the silicon carbide granules/powder is washed with a solution of hydrofluoric acid. In one embodiment, washing of the silicon carbide granules is applied for a short period of time, ranging from a few seconds to a few minutes, followed by rinsing of the silicon carbide granules in distilled water, and drying of the granules, according to processes known in the art.

After a pure silicon carbide granule/powder is provided, the gel-casting process can proceed according to known methods. First, the silicon carbide powder is mixed with water (or a non-aqueous solvent), a dispersant, and gel-forming organic monomers (later linked to provide the gel that binds the ceramic particles together) to obtain a ceramic slurry. Next, the ceramic slurry is exposed to a partial vacuum to remove air from the mixture, thereby preventing bubbles from causing flaws in the sintered part. After air bubbles are removed, a polymerization initiator ("catalyst", as might be chosen by a person or ordinary skill in the art) is added to the mixture to commence the gel-forming chemical reaction. Pouring the ceramic slurry into molds—likely comprised of metal, glass, plastic, or wax, as is well-known in the art—casts the ceramic slurry into the desired workpiece shape. In some embodiments, vibratory forces may be applied during the mold fill. Such vibratory forces may include application of a pulsating electric current and ultrasonic vibrations. Without being bound to any particular theory, it is believed that such vibratory forces orientate the silicon carbide grains. Next, the mold can be heated in a curing oven or set with a catalyst. The catalyst can cause the monomers to form large cross-linked polymer molecules that trap water and create a rubbery polymer-water gel. Heat caused by pulsating electric current or ultrasonic vibration can also be used to set the cast.

After drying, the casting should be placed in a graphite crucible coated with material (like investment ceramic) to protect it from oxidation during the next process. The casting is suspended within the crucible in Fluorite powder that is packed and vibrated to compact the powder around the gel casting. The crucible is capped to contain the powder and eliminate the air from the chamber. This supports the casting to enable the binder to be burned out. When the binder is burned out, it causes the castings to expand and distort. Being securely packed in powder, the casting can vent as it gasses out and maintain its shape. After degassing the casting within crucible, the crucible is then placed in an oven and heated to around 1000° F. while an air bleed is being fed into the capped crucible at very low pressure and volume. In certain embodiments, the range of pressure used to maintain the casting within the capped crucible is 0.4 to 6.9 kPa (1-16 ounces per square inch). However, pressures ranging from 6.9 to 27.6 kPa (1 to 4 pounds per square inch) have been shown not to cause any turbulence within the powder. Heat is maintained until oxygen precipitates through the fluorite powder and the gel binding material is consumed as fuel, leaving the SiC suspended in the fluorite media. The fluorite packed powder provides support for the casting which may become fragile as the gel-binding material (e.g., acrylamide or methacrylamide) is burned out. The time necessary to accomplish oxygen precipitation through the Fluorite powder and the consumption of gel binding material generally depends on size of the sample and in certain cases for particularly sized samples may take about 24 hours. Tests with acrylamide show that the gel is consumed during this process leaving no ash to contaminate the SiC. After the necessary time to oxidize the binder, the crucible is heated to just below the 1450° C. melting temperature of the fluorite. In certain embodiments, the crucible is heated to a temperature ranging from about 1400° C. to less than 1450° C. In other embodiments, the crucible may be heated to a temperature ranging from about 1410° C. to less than 1450° C., from about 1420° C. to less than 1450° C., from about 1430° C. to less than 1450° C., from about 1440° C. to less than 1450° C. and from about 1445° C. to less than 1450° C. This begins to sinter the SiC while it is held in situ by the powder media. The length of time necessary to complete this heating step depends on the size and shape of the casting. In certain embodiments, this heating step may be completed in less than an hour for particularly sized and shaped castings. After suitable time to begin bonding of the SiC to itself, the main sintering process may now begin. Once the casting has lightly bonded to itself, the fluorite can be heated to a liquid state at sintering temperatures and the casting will float in the molten bath where the pressure, vibration, and electrical current can come to bear.

One novel additional step incorporated into the gel-casting process described above is to further compact the silicon carbide granules by applying vibratory forces. Such vibratory forces may include application of a pulsating electric current and ultrasonic vibrations. The irregular shape of silicon carbide grains inhibits sintering due to the relatively small contact surface area compared to other ceramics. In certain embodiments, applying vibratory forces to compact the grains may achieve a particle size of approximately one micron (0.000001 m), although other compaction ratios and contact areas are also encompassed within the disclosed process. Such vibratory action packs the fine grains into a coarse grain structure of melted/fused grains. In one embodiment, the vibratory forces (e.g., a pulsating electric current and/or ultrasonic vibrations) are applied during the initial mixing stage of the powder, water, dispersant and monomers. In another embodiment, the vibratory forces (e.g., a pulsating electric current and/or ultrasonic vibrations) are applied during a de-airing step to drive air out. Without being bound to any particular theory, it is believed that de-airing assists in orientating the silicon carbide particles to each other. During the de-airing step, a vacuum or pressure may also be applied in addition to the application of the vibratory forces. In yet another embodiment, the vibratory forces (e.g., a pulsating electric current and/or ultrasonic vibrations) are applied while the catalyst is added. In one embodiment, vibratory forces (e.g., a pulsating electric current and/or ultrasonic vibrations) are applied while the ceramic slurry is cured into a gel inside the mold. In one embodiment, low pressure (under about 1000 psi or about 6895 kPa) will be applied to the mold during vibration to drive air out. This is in contrast to conventional sintering processes which typically apply 10,000 to 20,000 psi without the application of vibratory forces. In yet other embodiments, vibratory forces (e.g., a pulsating electric current and/or ultrasonic vibrations) are applied during every step of the gel-casting process, or in various combinations of the steps recited as parts of the process. An ultrasonic wand may be utilized to produce the ultrasonic vibrations. In some embodiments, an ultrasonic wand is introduced into the slurry to produce the desirable amount of vibrations. In other embodiments, well known in the art, other means for applying ultrasonic vibrations can be used.

After a gel-cast part is removed from the mold, the cast ceramic is left to dry which, in certain embodiments, allows for thorough removal of a substantial portion of the solvent to occur. Preferably, such drying would occur at a high relative humidity. The dried cast ceramic part is now capable of being machined by carbide steel tools, as may be necessary, and depending on the desired final shape of the workpiece. To produce a finished part, two remaining steps (which can be combined into a single step, in some embodiments) are necessary. First, the green body gel part is fired in an oven, typically at a temperature ranging from about 100° C. to about 1600° C., to remove, or burn out, any polymer remaining in the ceramic. If polymers remain within the ceramic during the next step, defects and cracks may occur. Second, the ceramic is subjected to much higher temperatures to sinter the ceramic. In one embodiment, the ceramic is subjected to intense heat ranging from about 1600° C. to about 2100° C. to sinter the ceramic. Prior to and during firing, the castings are sponge-like as the water vapor and carbon based binders are evaporated or burned out.

The sintering process further includes the application of vibratory forces. Such vibratory forces may include the application of ultrasonic vibrations, while the green part (a.k.a., the green body) is being subjected to high temperatures, to further effectuate removal of polymers and remove any remaining air bubbles. In other embodiments, vibratory forces may be applied by capping a crucible containing the bath and green body and pulsing an electric current through the bath. Currently, air bubbles in the silicon carbide slurry, and/or green part, don't necessarily get smaller, or escape, during the casting or sintering process, resulting in parts containing air pockets within the silicon carbide matrix. Parts with air pockets/bubbles in the matrix are not as strong, and are very resistant to sintering. As a consequence, in certain embodiments, such vibratory forces are applied in either the gel-casting or sintering stages of the process; while, in other embodiments, the vibratory forces are applied during both the gel-casting and sintering stages of the process.

In yet other embodiments, the green body (i.e., the ceramic cast part) is sintered within a vessel (e.g., a capped crucible) containing molten liquid which is subjected to a pulsating electrical current. In other embodiments, the green body may be sintered within a vessel containing molten liquid which is subjected to ultrasonic vibrations. The green body may also be subjected to high pressure ("hot pot") while vibratory forces are simultaneously applied to a vessel capable of enduring such pressure and vibratory forces. The pressurized liquid will exert uniform pressure on all aspects of the part shape without the need for pressing dies. The application of vibratory forces will help the silicon carbide grains slip on themselves to allow uniform grain packing. In theory, less pressure should be needed for compaction due to the pressure waves which results in resetting the silicon carbide grains until they cannot move any more due to complete compaction. Such processing super-packs the silicon carbide grains and distorts them in a manner that imparts a higher density than was previously thought to have been possible, and in turn produces a higher theoretical density, promoting the transfer of atoms (electrons) necessary for improved sintering. In one embodiment, the green part (a.k.a., green body) will be sintered inside of a capped graphite crucible containing a molten liquid capable of reaching sintering temperatures and sustaining conditions of high pressure. In yet other embodiments, the crucible may need to be held in an inert atmosphere or vacuum to keep from being consumed as fuel at sintering temperatures. In some embodiments, the molten liquid may be fluorite. In other embodiments, the liquid can comprise other compositions capable of achieving sintering temperatures and conditions of high pressure. The purpose of capping the crucible and pressurizing the molten liquid is to allow fast and consistent heat transfer to the silicon carbide while uniformly packing the grains under high pressure by transferring shock waves from the electrical pulses to the silicon carbide part. In one embodiment, the crucible is induction heated—a safe and reliable alternative to hot pressing and hot isotonic pressing—while vibratory forces, are simultaneously applied to agitate the crucibles. Through induction heating, a temperature ranging from about 1600° C. to about 2100° C. can be achieved which allows for sintering. Induction heating may also be used to achieve a sintering temperature ranging from above 1950° C. to less than about 2200° C., in further embodiments to achieve a sintering temperature ranging from about 2000° C. to less than about 2200° C., in further embodiments to achieve a sintering temperature ranging from about 1600° C. to less than about 2200° C., in further embodiments to achieve a sintering temperature ranging from about 2000° C. to less than about 2200° C., in further embodiments to achieve a sintering temperature of about 2100° C., in further embodiments to achieve a sintering temperature ranging from about 1600° C. to about 2000° C., in further embodiments to achieve a sintering temperature of about 2000° C. In yet other embodiments, hollow silicon carbide parts and other types of ceramic materials may be obtained by coring a wax within the gel castings themselves. Examples of wax which may be used for this process include beeswax, paraffin wax and any type of investment casting grade of wax. Such waxes are capable of holding the desired casting shape and of burning out during the drying and sintering process. This method encompasses the use of coring which is sufficiently vented, as is known in the art, to allow influx of molten liquid into chambers within the hollow silicon carbide castings allowing pressure or resistance to be distributed evenly on substantially every surface of the part. Hollow cores can produce more uniform wall thickness and reduce strain across larger part sections. Sintering times can be greatly reduced. Thick-to-thin section stress will be reduced. More complete sintering will happen faster due to thinner sections. In some applications, hollow parts will be stronger and lighter. Hollow cores can be filled with other materials to enhance silicon carbide properties (i.e. urethane with Kevlar or para-aramid synthetic fibers).

There are several advantages of using induction heating to heat the crucible over hot pressing and hot isotonic pressing. In hot pressing methods, the graphite pressing dies act as heat sinks to the ceramic material. Consequently, it is impossible to maintain high pressure and temperature over time for sintering by hot pressing. The presently disclosed method allows for silicon carbide to be held at the sintering temperature indefinitely, allowing ample time for grain plastic deformation and particle diffusion.

Under certain conditions, free silicon may be combined with carbon to form silicon carbide to benefit the shape holding of the casting. For example, sintering in a high carbon flame or rich fuel/air mixture (i.e., a fuel/air mixture containing less than the stoichiometric ratio of 14.7 pounds of air per pound of fuel) typically supplies a high carbon atmosphere which is oxygen deficient (zero or near zero levels of oxygen) that can inhibit the forming of silicon dioxide on the surface of the granules and cause free silicon to combine with carbon to form silicon carbide. This process of forming silicon carbide from silicon dioxide in the presence of a high carbon flame (rich fuel/air mixture) begins to occur at temperatures above about 800° C. and may also occur at sintering temperatures. Use of a high carbon flame can eliminate excess silicon which may greatly lower properties such as temperature resistance, tensile strength and compressive strength of the silicon carbide. In certain embodiments, sintering within an oven can be eliminated and instead, can be accomplished by strictly doing it in an open flame. For example, natural gas flame temperature is 1950° C., and is hot enough to complete the sintering. Parts would be very close to finished before they made it to the liquid bath.

Figure 2:
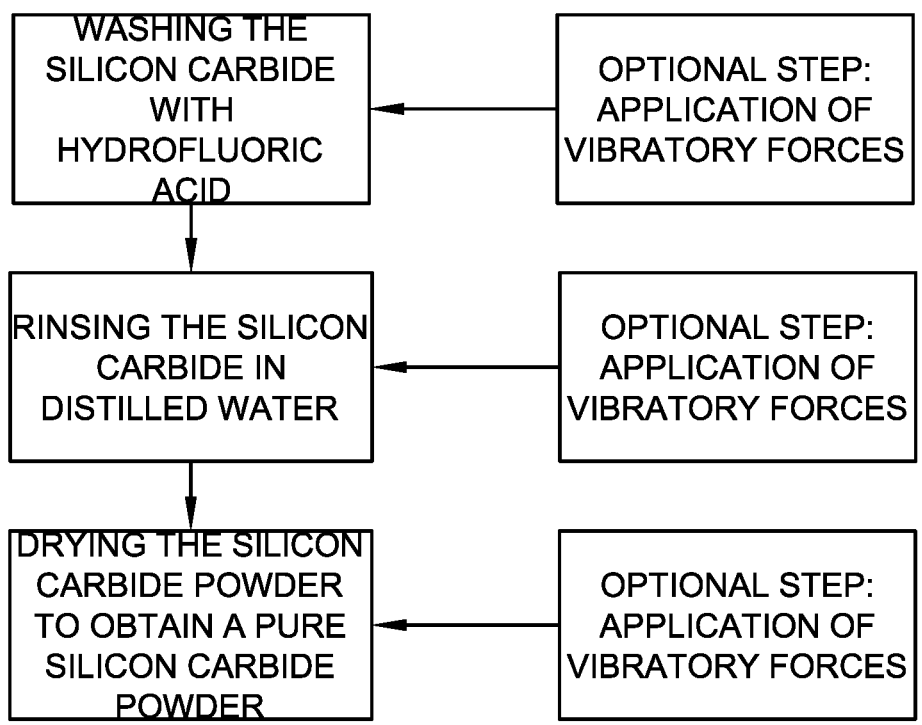
FIG. 2 is a flow chart of the steps of various embodiments of a process for purifying silicon carbide.
Figure 3:
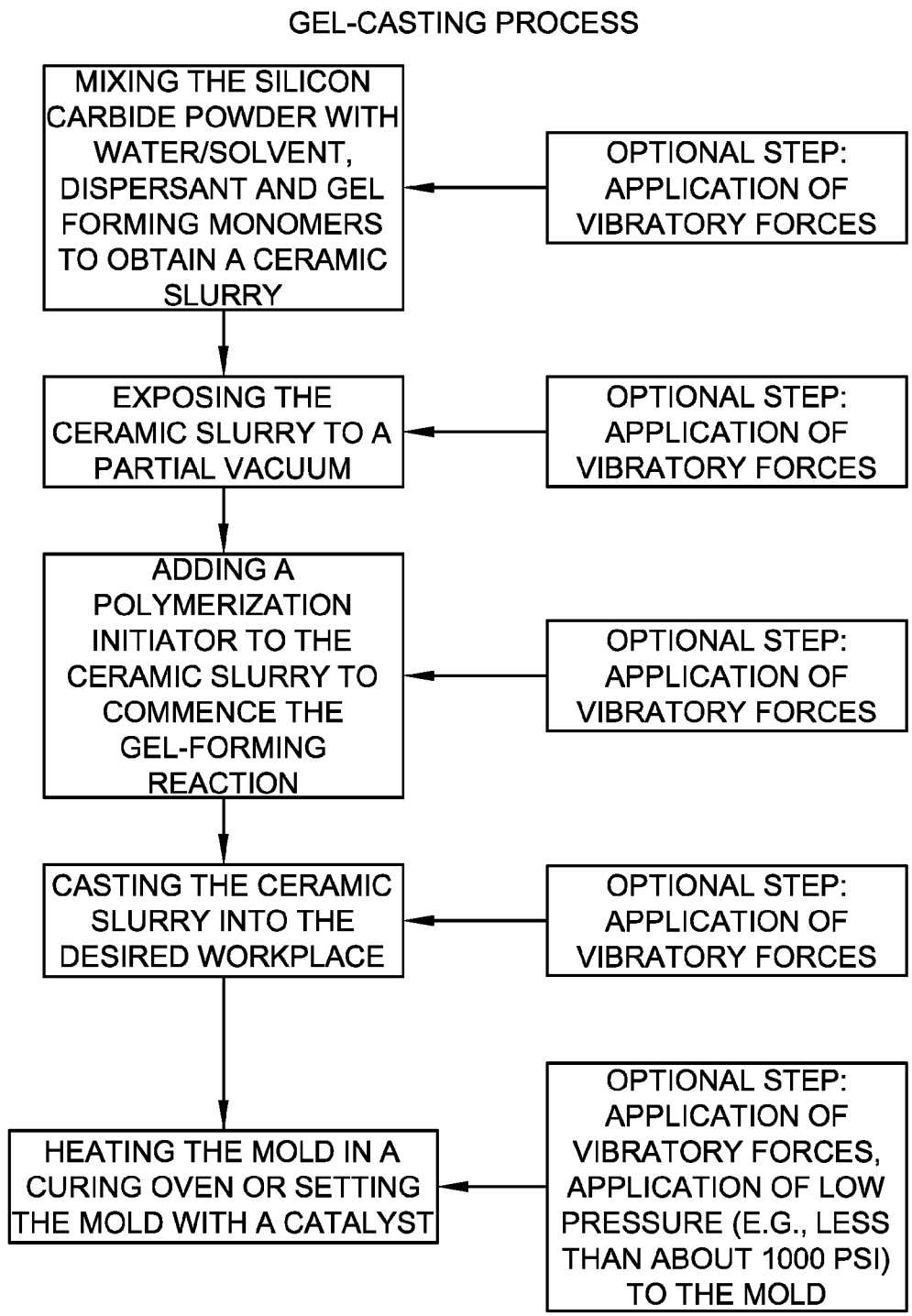
FIG. 3 is a flow chart of the steps of various embodiments of a gel-casting process.
Figure 4:
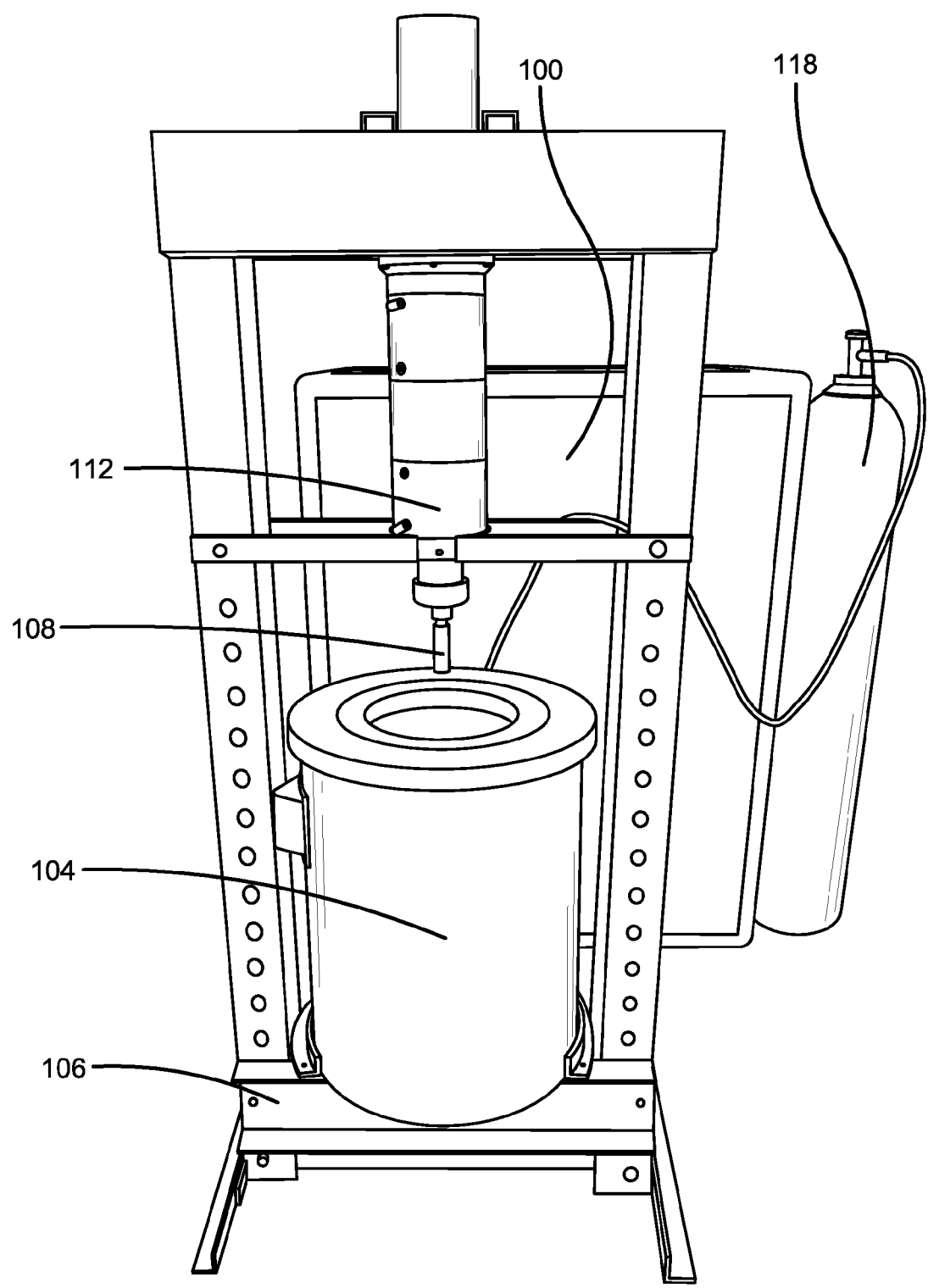
FIG. 4 is a planar view of an exemplary apparatus which may be used to induction heat a crucible.
Figure 5:
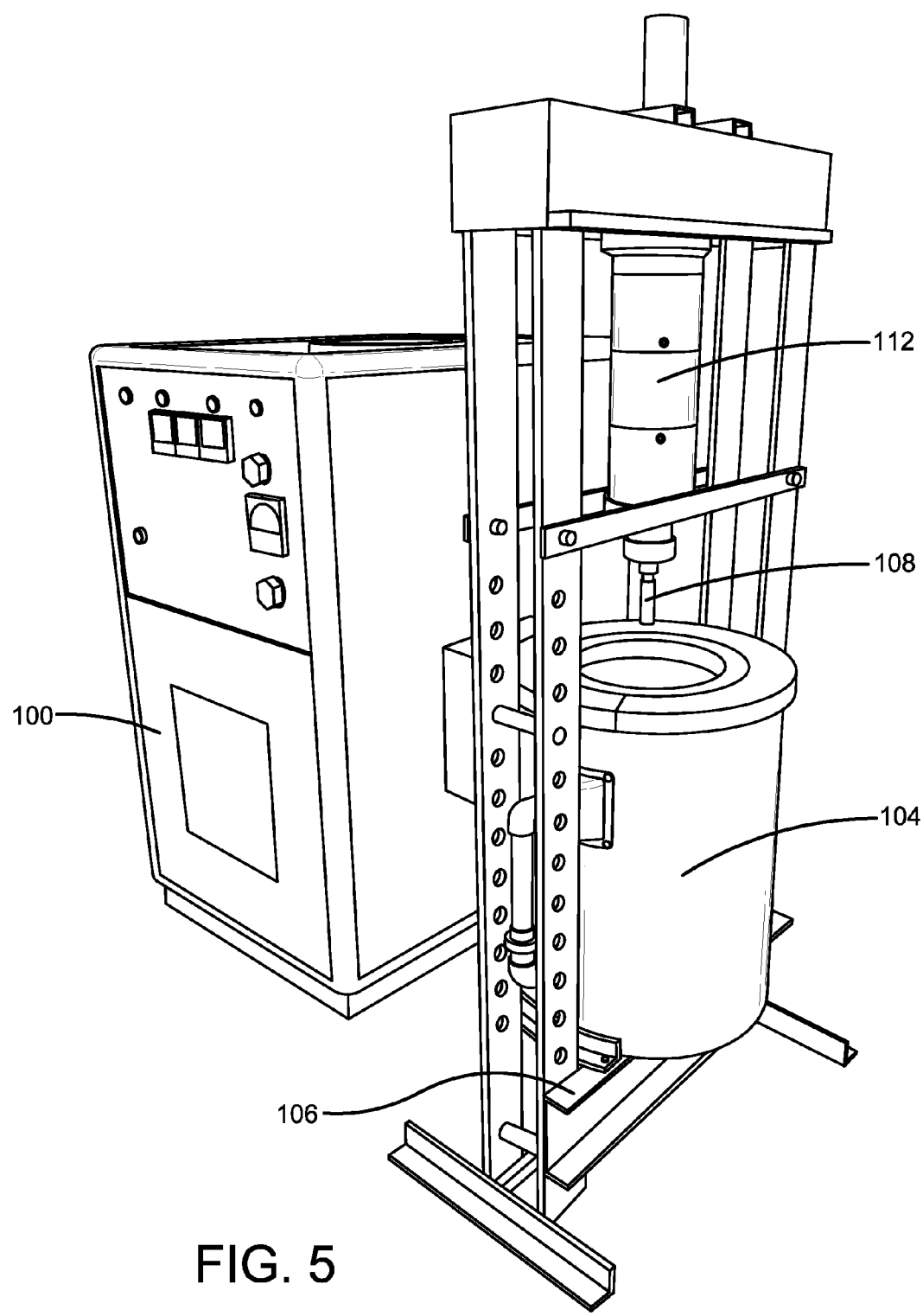
FIG. 5 is a perspective view of an exemplary apparatus which may be used to induction heat a crucible.
Figure 6:
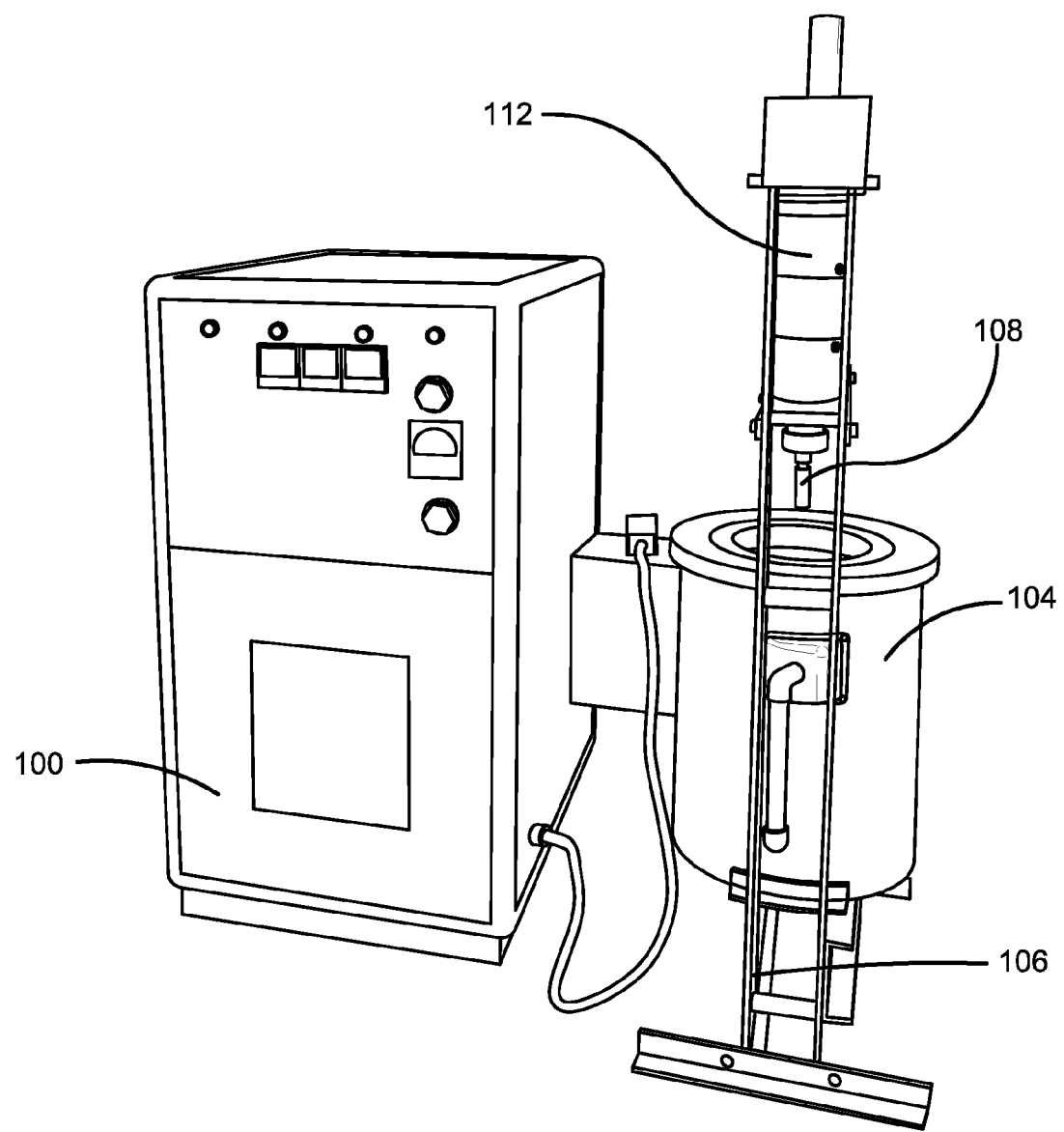
FIG. 6 is a side view of an exemplary apparatus which may be used to induction heat a crucible.
Figure 7:
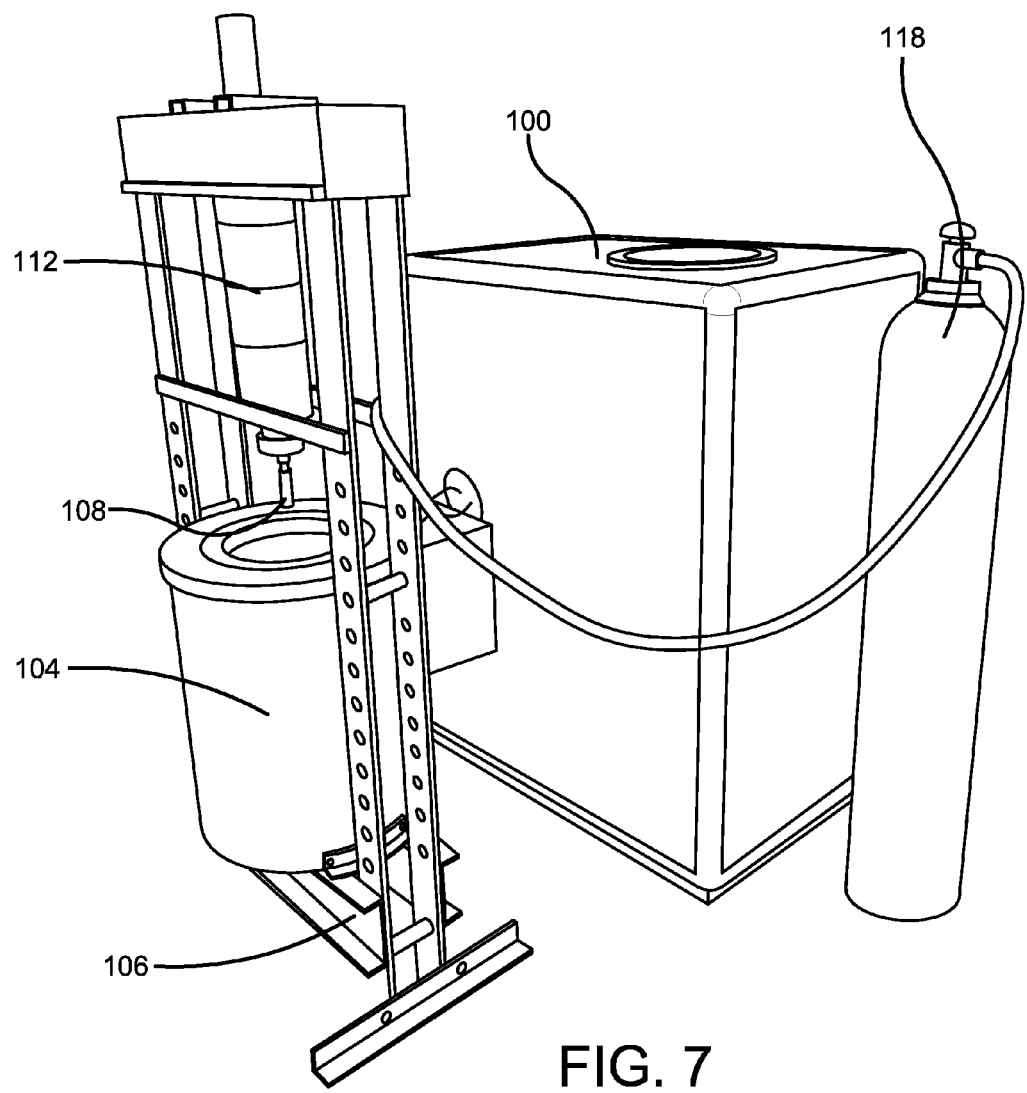
FIG. 7 is a perspective view of an exemplary apparatus which may be used to induction heat a crucible.
Figure 8:
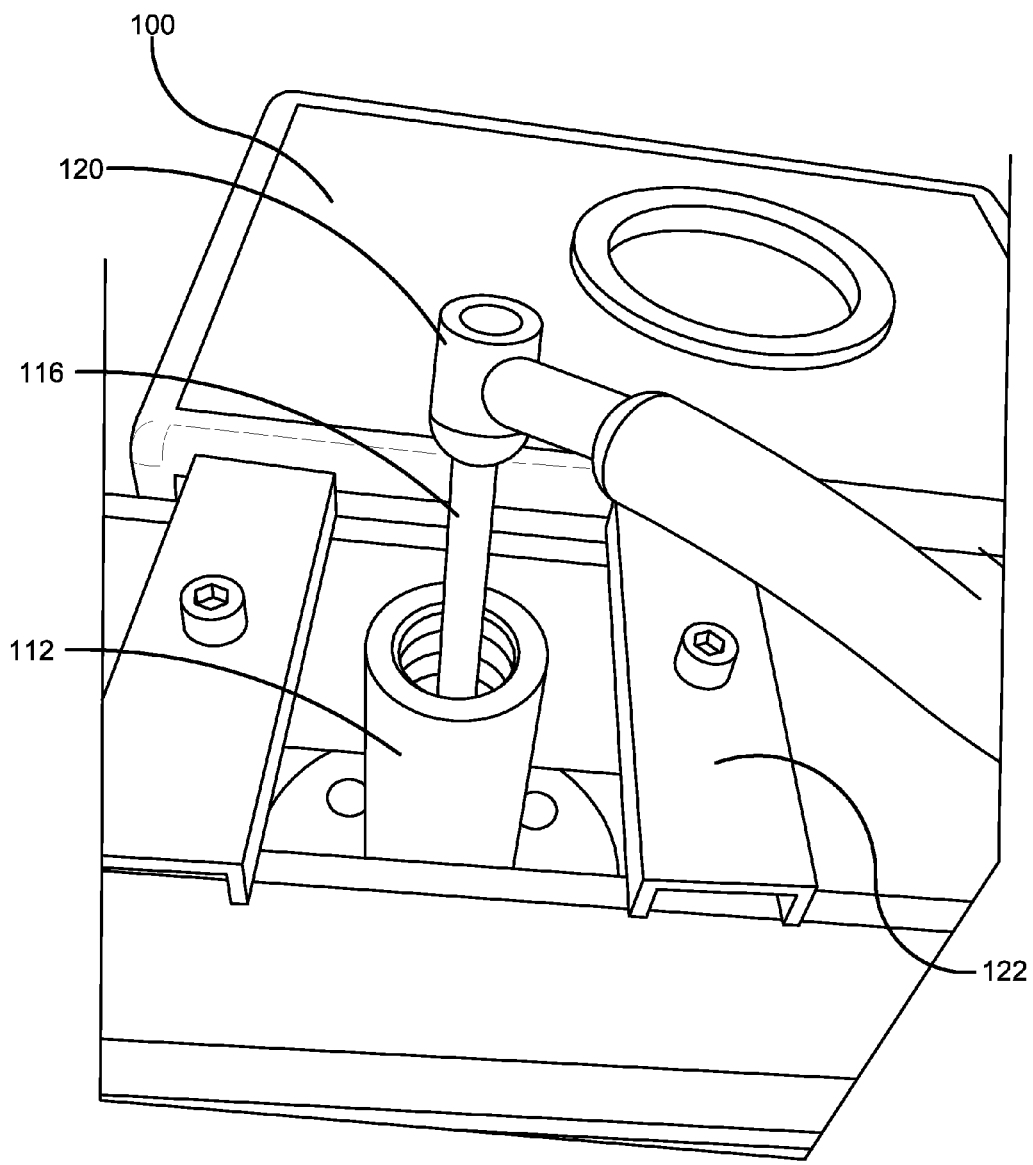
FIG. 8 is a top view of an exemplary piston and frame of an apparatus which may be used to induction heat a crucible.
Figure 9:
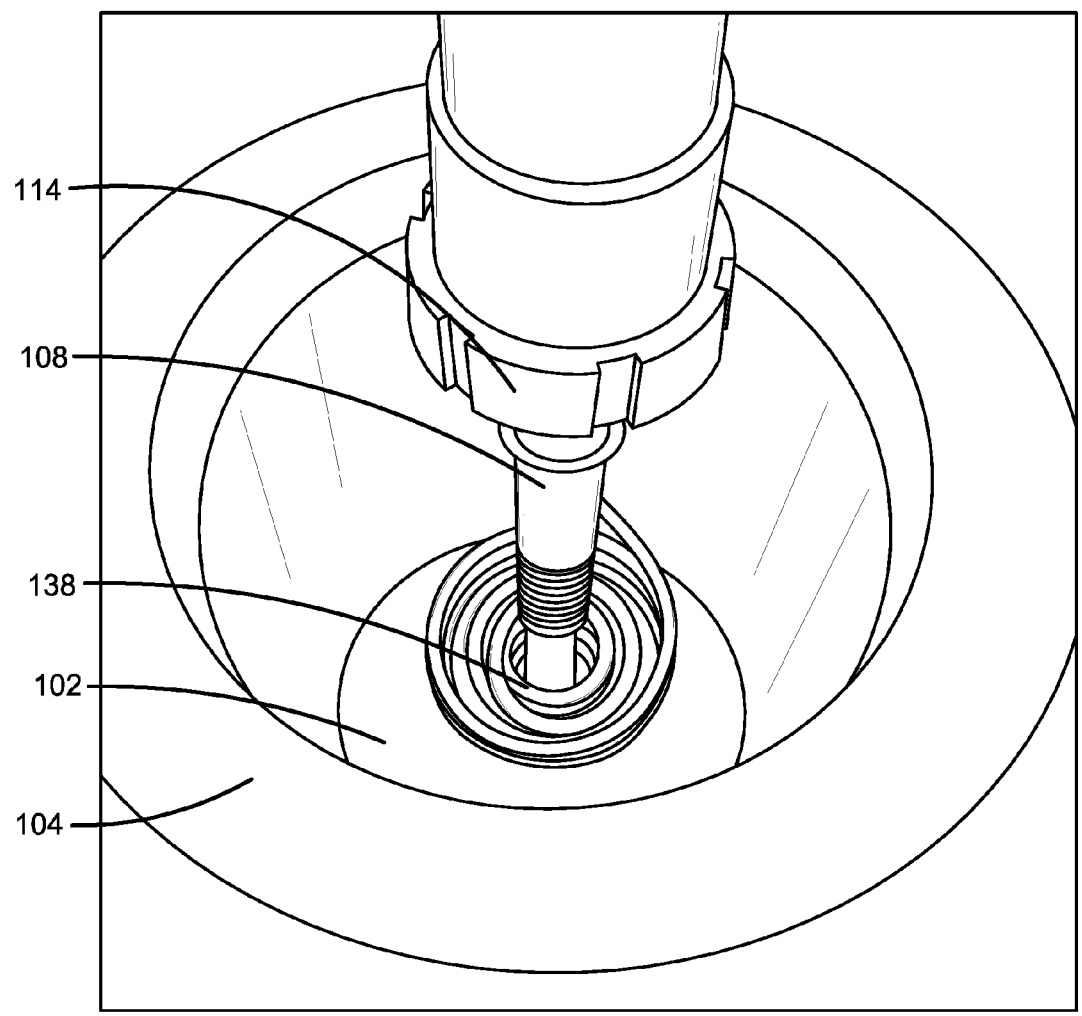
FIG. 9 is a top view of an exemplary apparatus which may be used to induction heat a crucible showing a piston capping the crucible.
Figure 10:
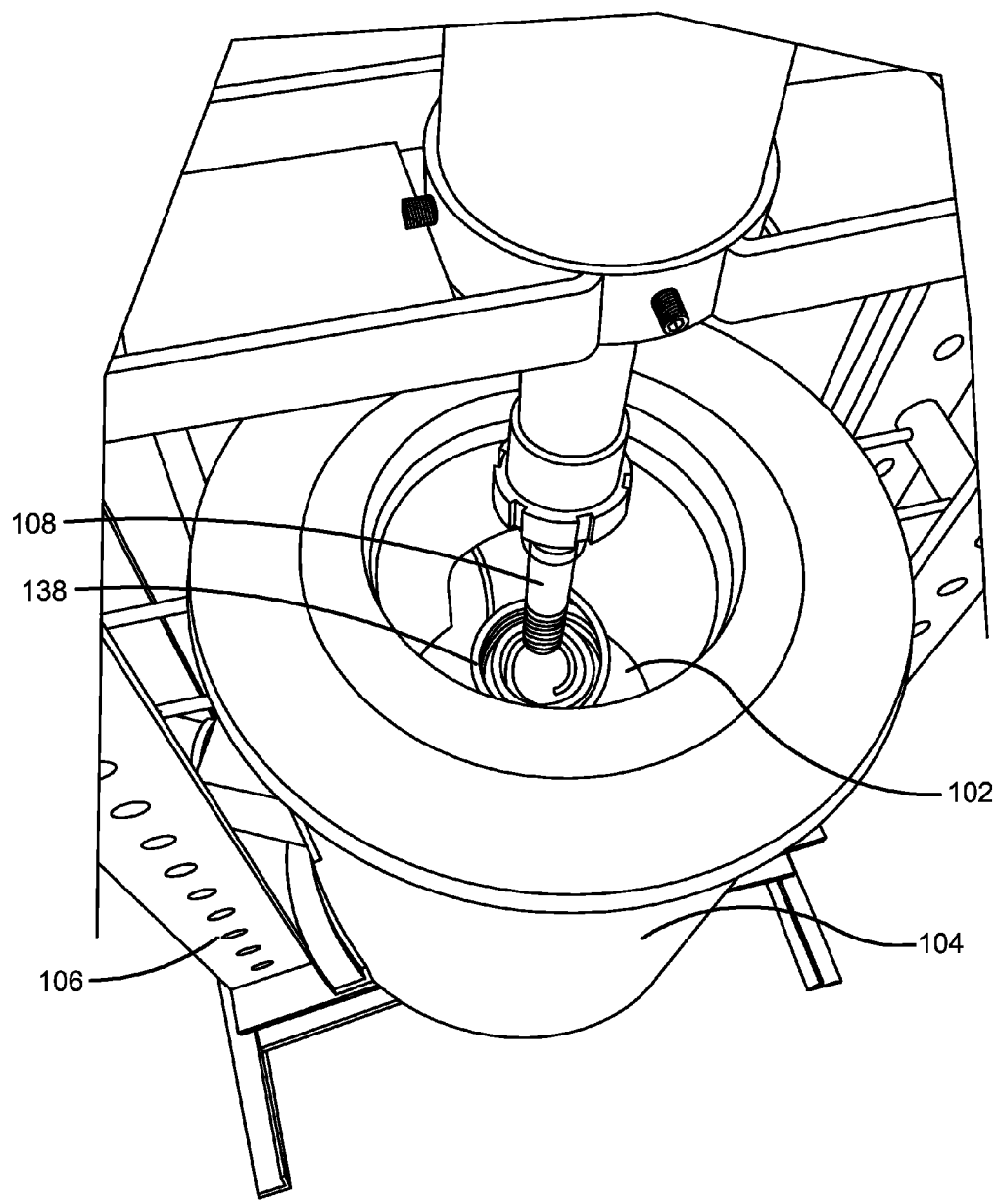
FIG. 10 is a top view of an exemplary apparatus which may be used to induction heat a crucible showing a piston capping the crucible and heating of the molten liquid.
Figure 11:
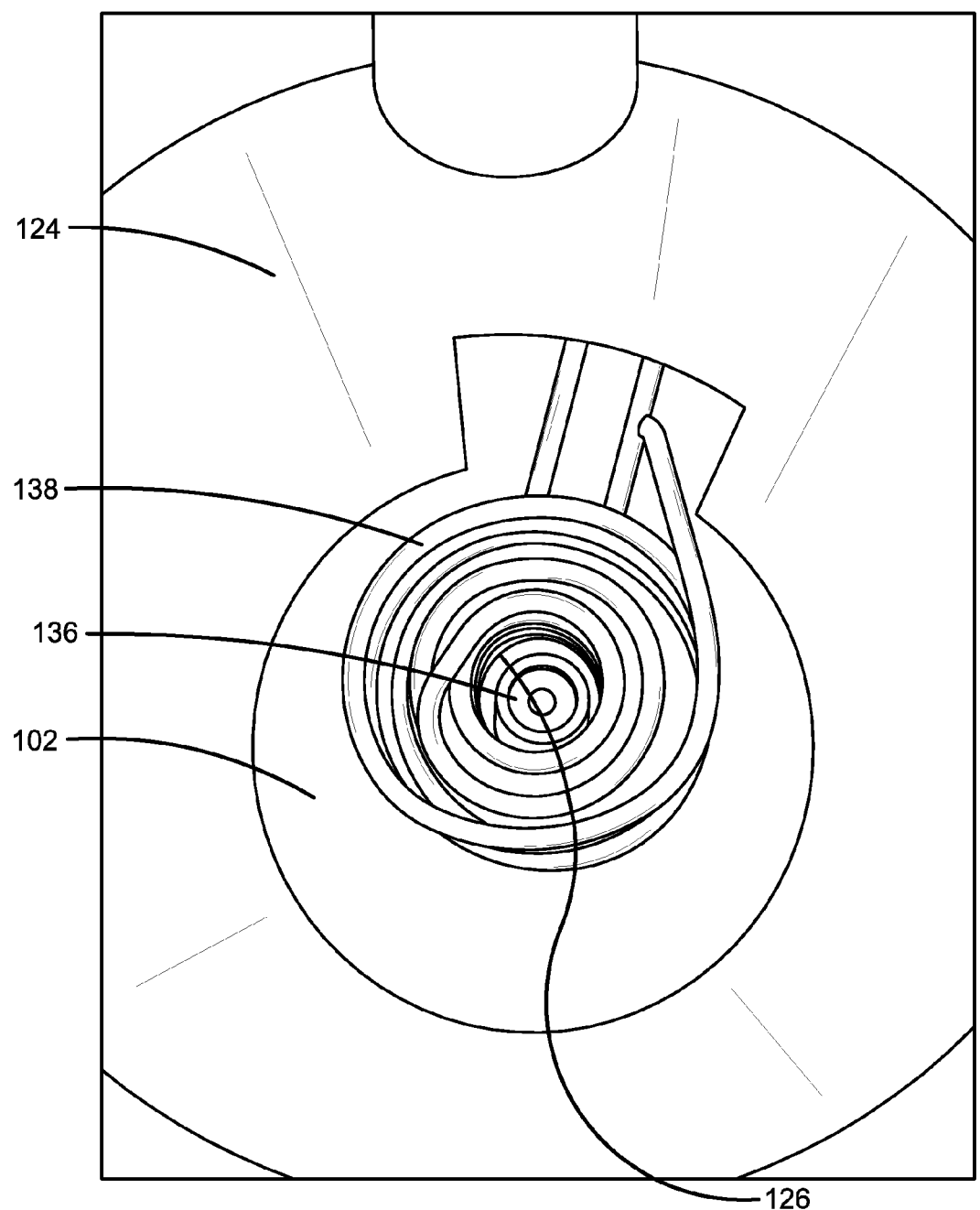
FIG. 11 is a top view of an exemplary apparatus which may be used to induction heat a crucible showing the crucible and a conductive rod.
Figure 12:
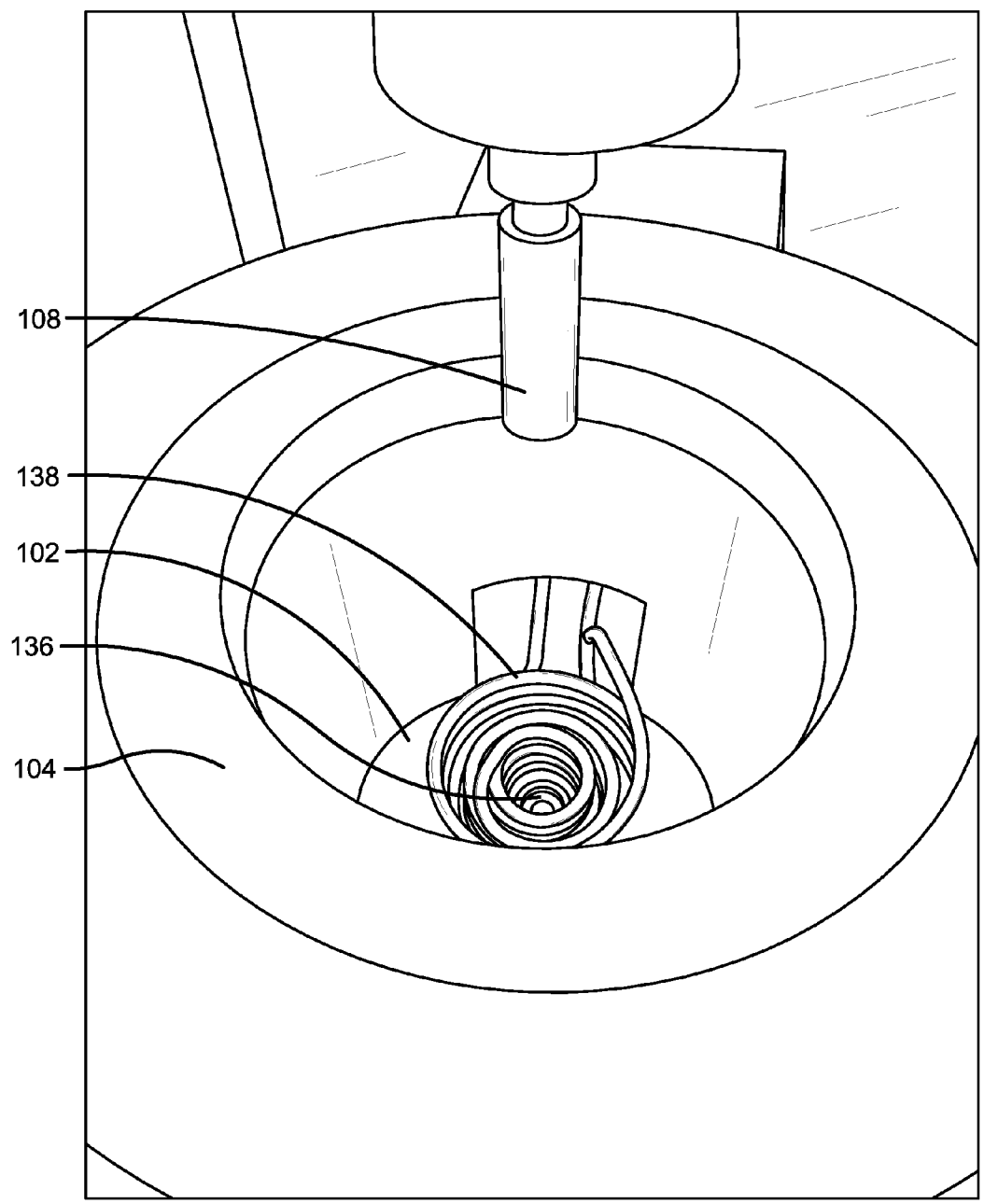
FIG. 12 is a top view of an exemplary apparatus which may be used to induction heat a crucible showing the crucible, a conductive rod and a piston.
Figure 13:
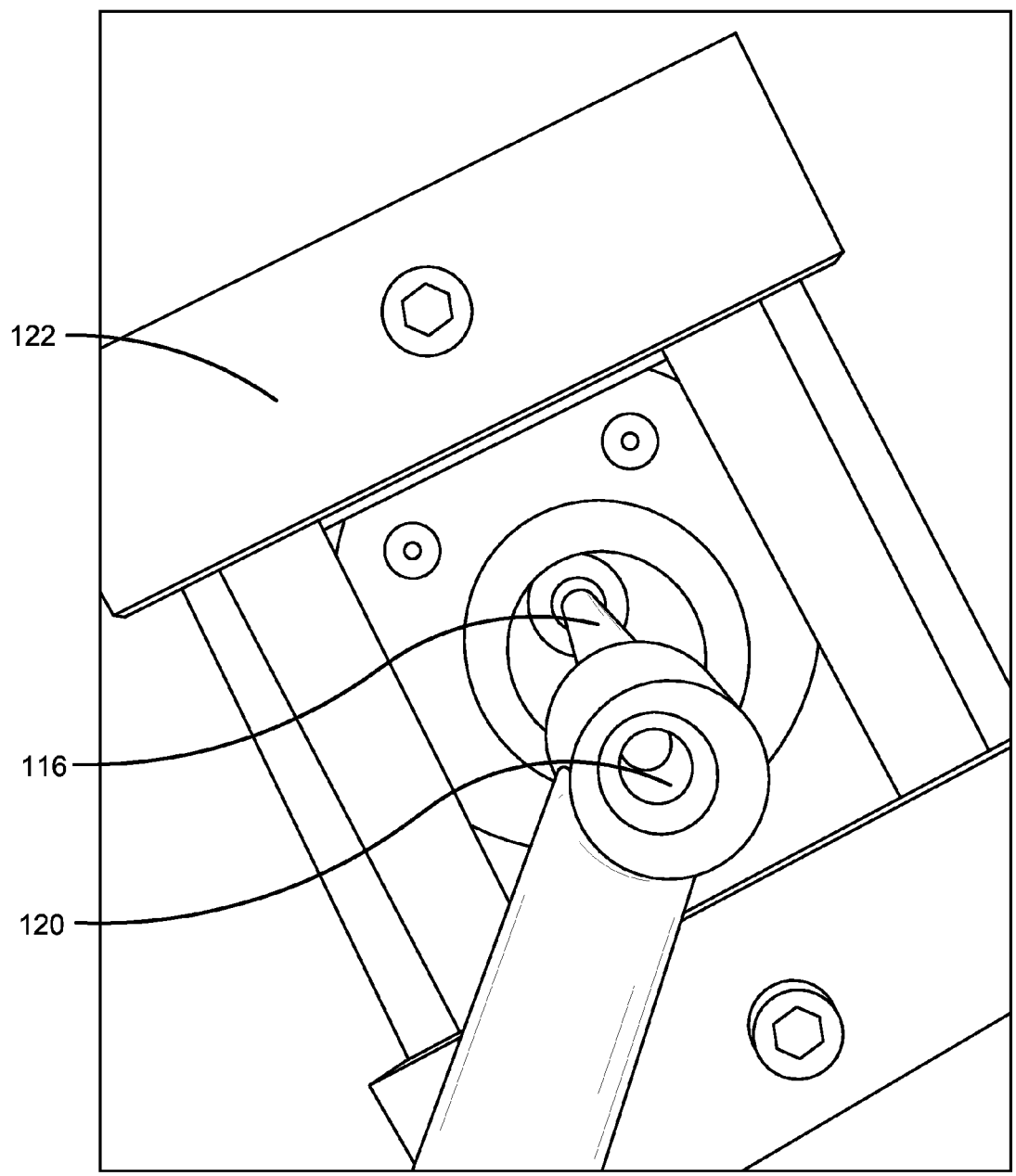
FIG. 13 is a top view of an exemplary piston and frame of an apparatus which may be used to induction heat a crucible.
Figure 14:
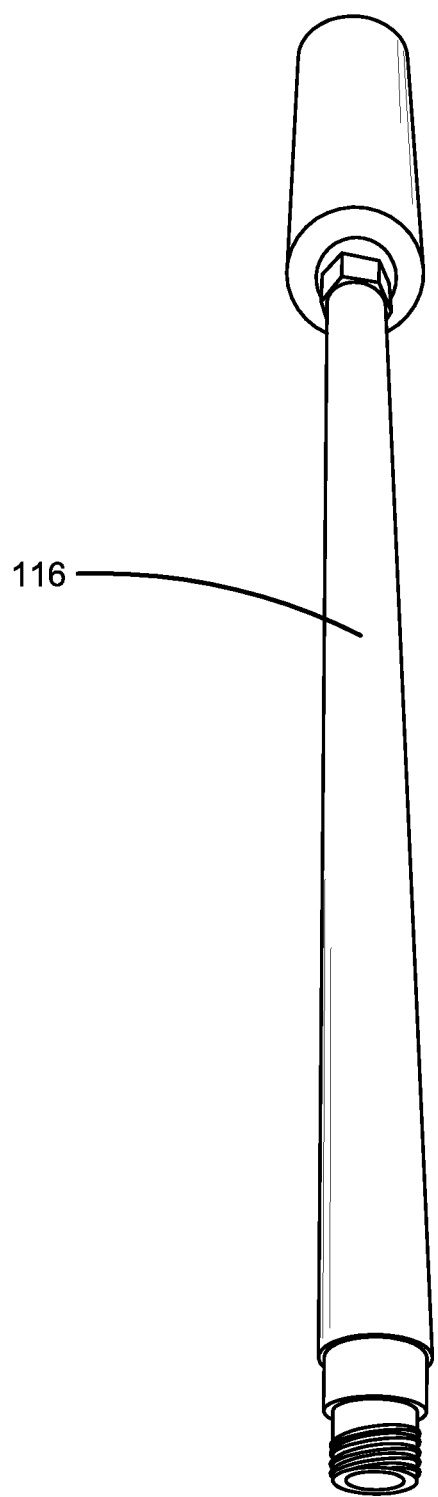
FIG. 14 is a perspective view of a hollow rod used in an apparatus for capping a graphite crucible.
Figure 15:
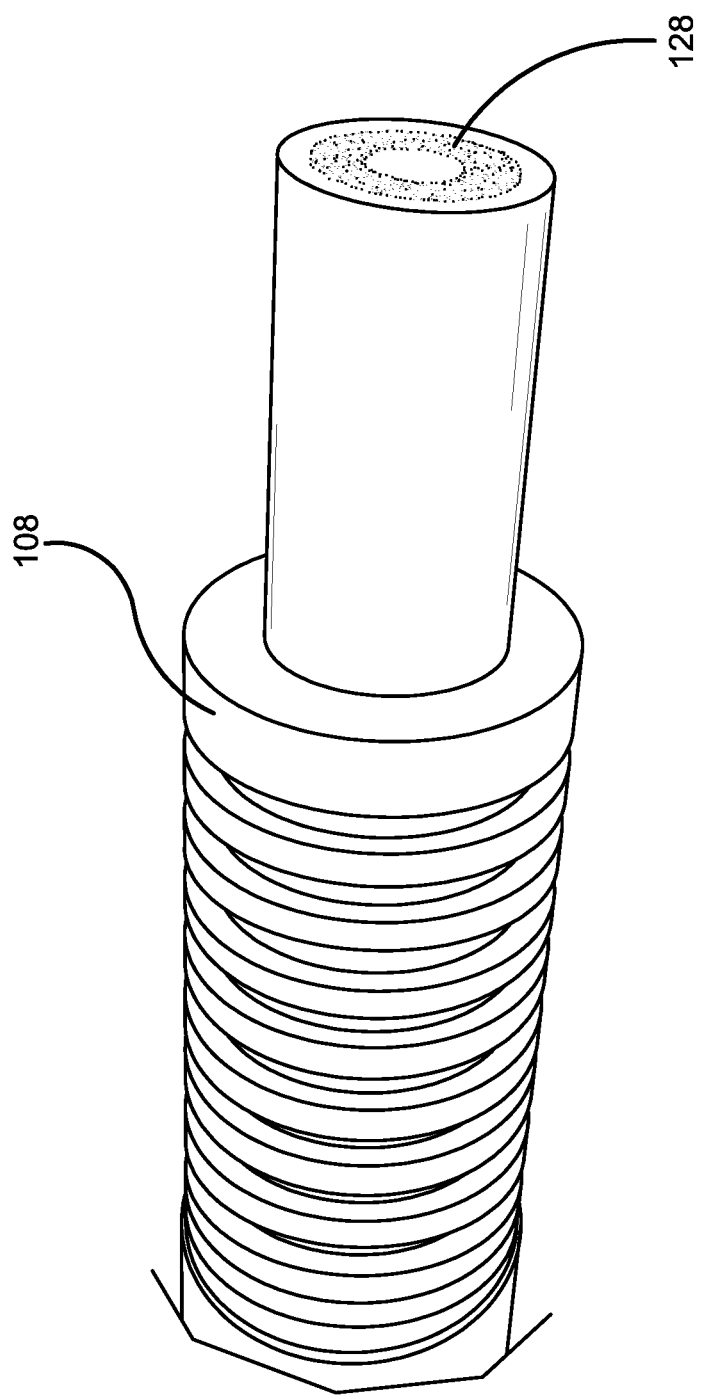
FIG. 15 is a perspective view of a graphite crucible cap having an electrode on its cap end.
Figure 16:
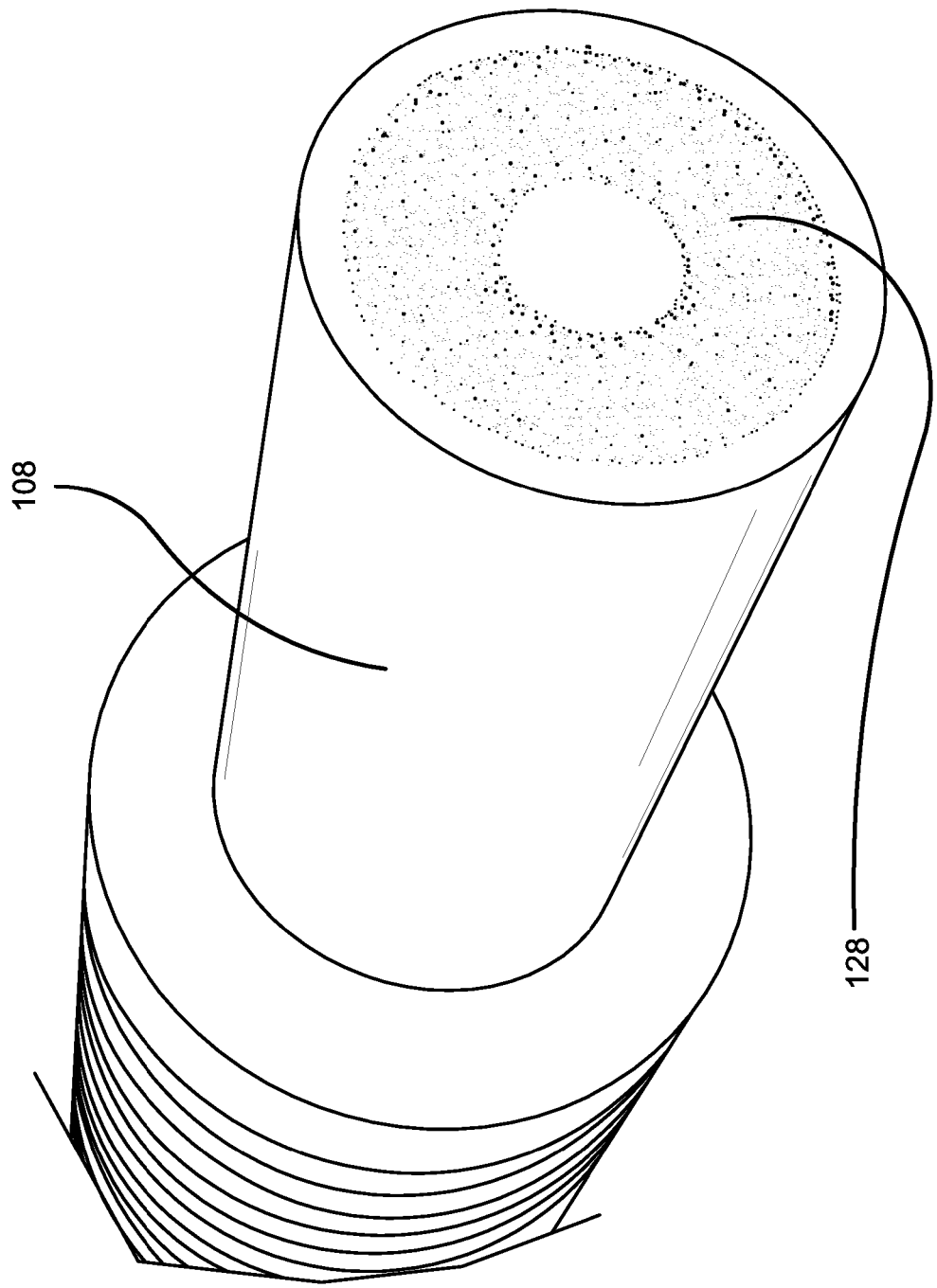
FIG. 16 is a perspective view of a graphite crucible cap having an electrode on its cap end.

FIGS. 1 through 3 are flow charts which illustrate various embodiments of the disclosed process. FIG. 1 is a flow chart of the steps which may be undertaken in various embodiments of a process for sintering silicon carbide. The process for sintering silicon carbide illustrated within FIG. 1 includes the steps of providing a silicon carbide powder, purifying the silicon carbide powder, subjecting the silicon carbide powder to gel-casting, drying the gel-cast part, firing the green body and sintering the green body. According to FIG. 1, vibratory forces may optionally be applied during the steps of providing, purifying, gel casting or sintering the silicon carbide powder or various combinations of the steps of the process. Also, the step of sintering the green body may include the optional steps of sintering in a molten liquid under high pressure ("hot pot"); sintering within a capped graphite crucible; heating the crucible through induction heating; holding the crucible within an inert atmosphere (e.g., a nitrogen atmosphere or any other inert atmosphere) or vacuum; application of vibratory forces to the crucible; venting the core of green body to obtain hollow silicon carbide parts; and sintering in an open flame.

FIG. 2 is a flow chart of the steps which may be undertaken in various embodiments of a process for purifying silicon carbide. The process for purifying silicon carbide powder includes the steps of washing the silicon carbide powder with a solution of hydrofluoric acid, rinsing the silicon carbide powder in distilled water and drying the silicon carbide powder to obtain a pure silicon carbide powder. According to FIG. 2, vibratory forces may optionally be applied to each and every step, an individual step or various combinations of the steps of the process.

FIG. 3 is a flow chart of the steps which may be undertaken in various embodiments of a gel-casting process for silicon carbide. The process for gel-casting silicon carbide includes mixing the silicon carbide powder with water or a non-aqueous solvent, a dispersant, and gel-forming organic monomers to obtain a ceramic slurry; exposing the ceramic slurry to a partial vacuum to remove air from the ceramic slurry; adding a polymerization initiator to the ceramic slurry to commence the gel-forming chemical reaction; pouring the ceramic slurry into molds to cast the ceramic slurry into the desired workpiece shape. According to FIG. 3, vibratory forces may optionally be applied to each and every step, an individual step or various combinations of the steps of the process. In addition, application of low pressure (e.g., less than about 1000 psi or about 6895 kPa) may be applied to the mold during curing or setting of the mold.

EXAMPLES

Cleaning of Silicon Carbide Granules with Hyrdrofluoric Acid

Hydrofluoric acid applied to silicon carbide grains has been shown to quickly remove $SiO_2$. When silicon carbide is exposed to hydrofluoric acid, there is a noticeable reaction of boiling and smoke. After an initial cleaning with hydrofluoric acid, there is no discernable reaction when reapplying hydrofluoric acid. Samples of silicon carbide cleaned with hydrofluoric acid and samples of silicon carbide which were not cleaned were sent to a materials lab where they were examined with a spectrograph. Oxygen levels on the cleaned samples of silicon carbide were markedly lower than on the uncleaned samples of silicon carbide.

Figure 23:
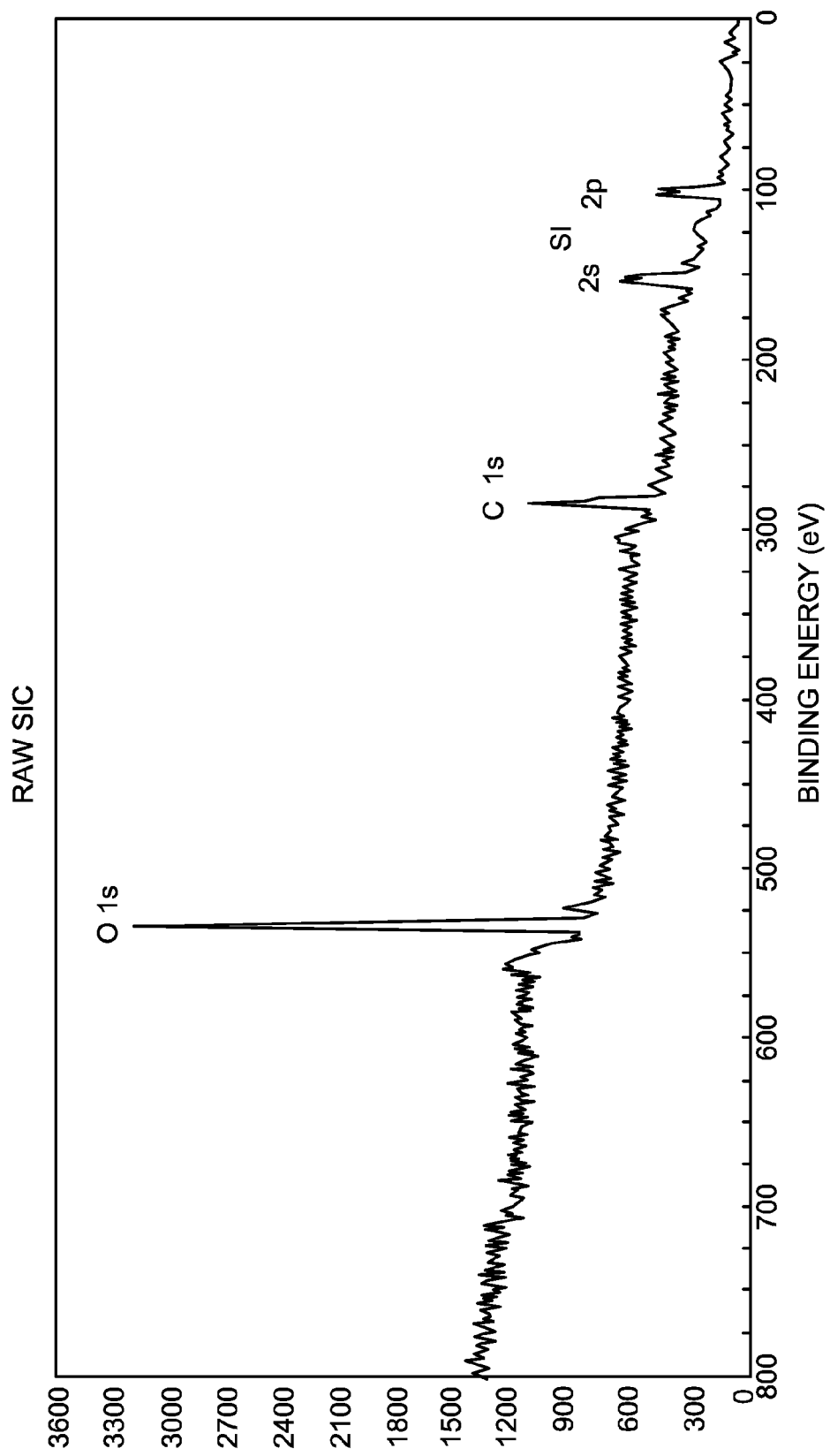
FIG. 23 is a spectrum of raw silicon carbide using x-ray photoelectron spectroscopy.
Figure 24:
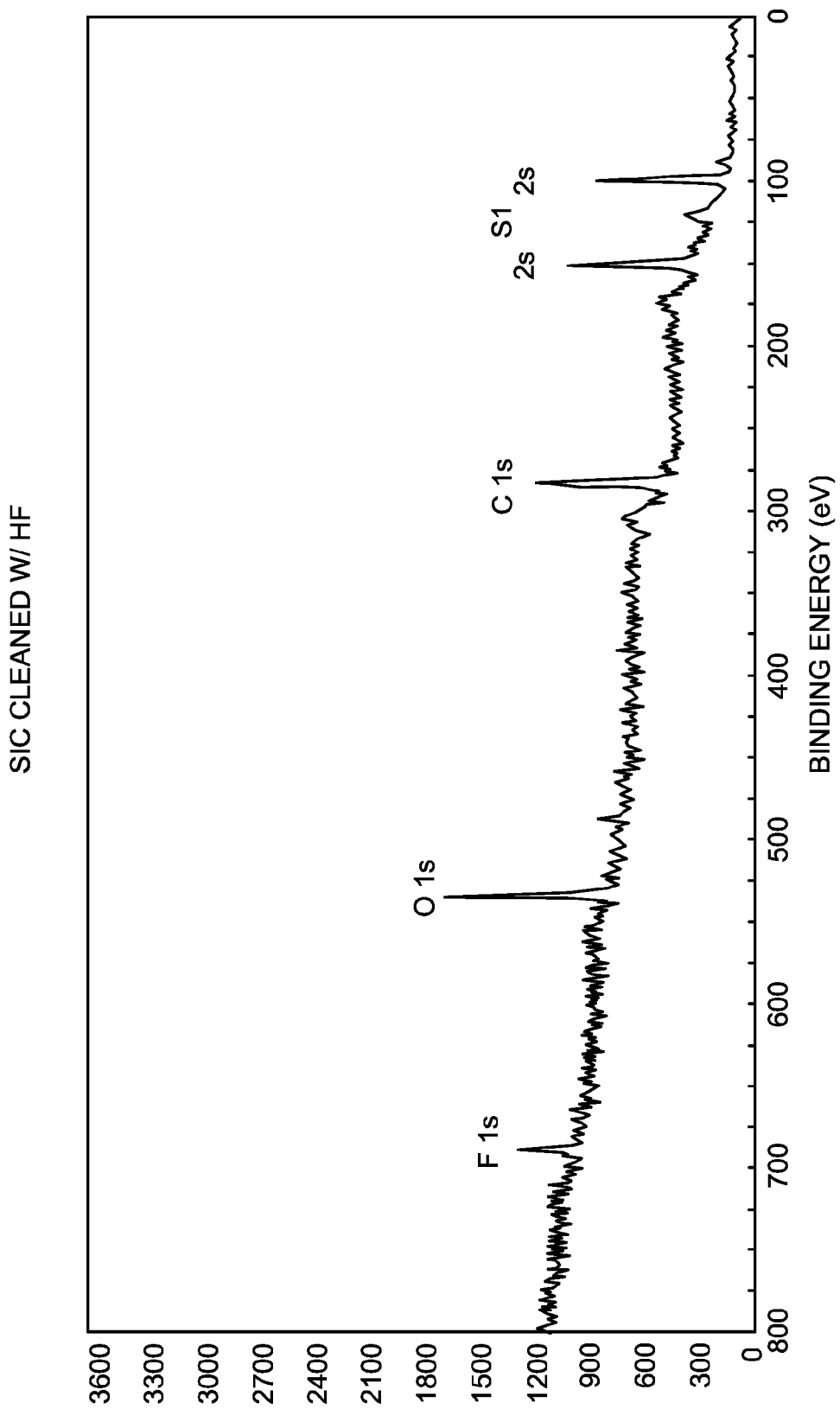
FIG. 24 is a spectrum of silicon carbide cleaned with hydrofluoric acid using x-ray photoelectron spectroscopy.

FIGS. 23 and 24 show a spectrum of a sample of raw silicon carbide and a sample of silicon carbide cleaned with hydrofluoric acid using x-ray photoelectron spectroscopy respectively. Both the raw and cleaned samples of silicon carbide contained silicon, carbon and oxygen. The cleaned sample (the sample treated with hydrofluoric acid) also contained fluoride. As illustrated within FIGS. 23 and 24, the sample treated with hydrofluoric acid contained markedly reduced levels of oxygen. Based on the results provided within FIGS. 23 and 24, the surface morphology is suspected to be very different between the samples, with untreated silicon carbide having much higher cohesion than the treated sample.

Figure 19:
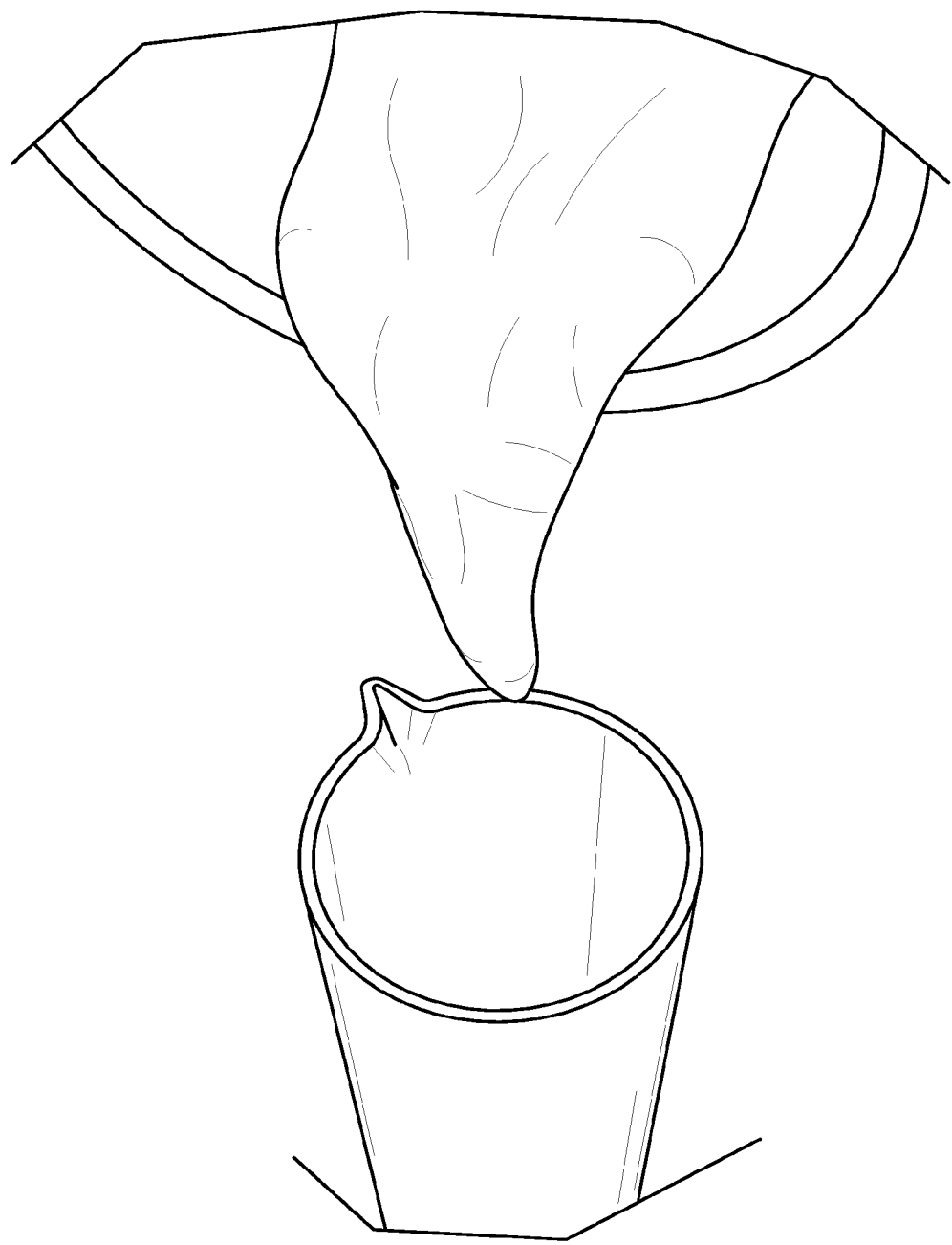
FIG. 19 shows clumping of silicon carbide when not treated with hydrofluoric acid.
Figure 20:
FIG. 20 shows clumping of silicon carbide when not treated with hydrofluoric acid.
Figure 21:
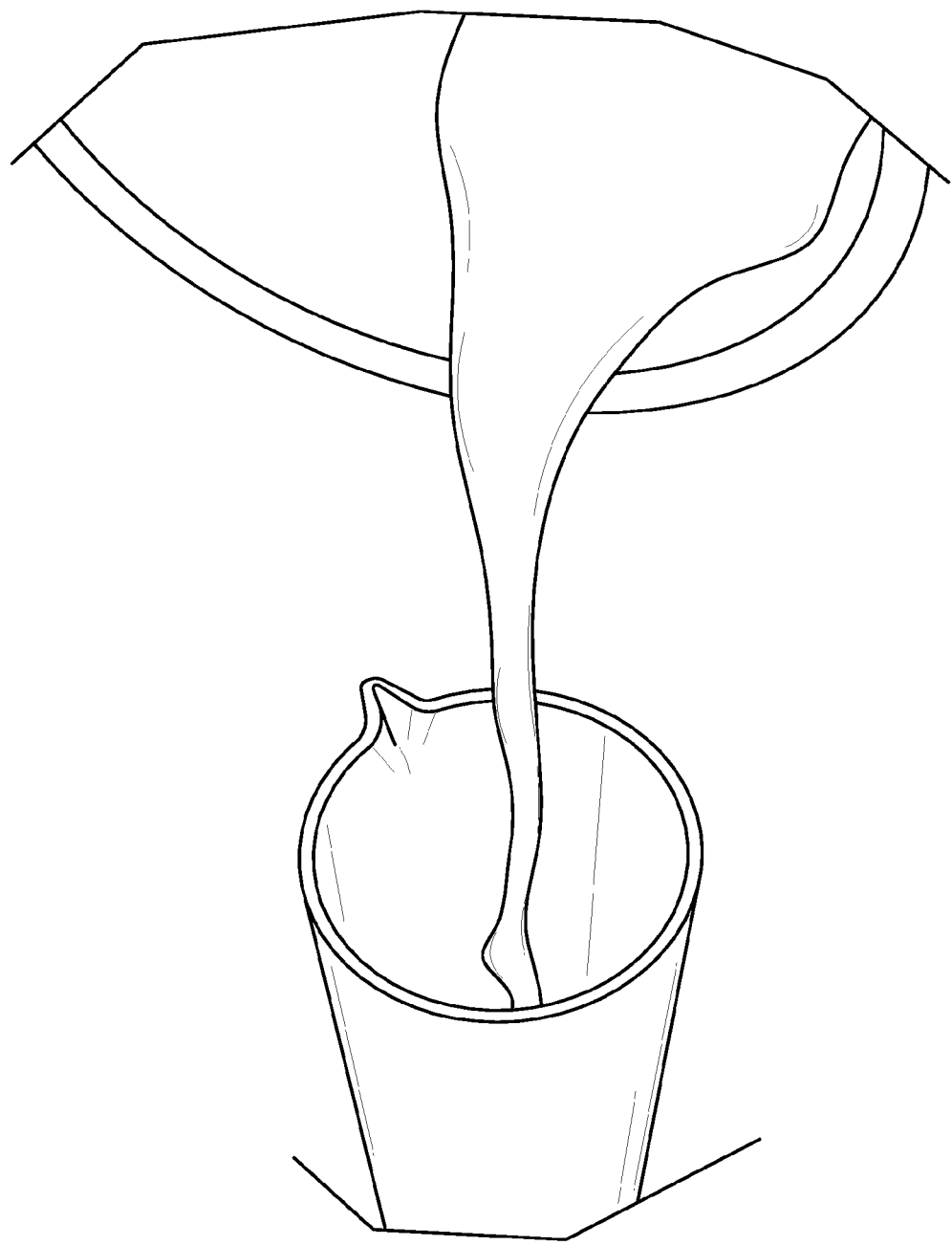
FIG. 21 shows no clumping of silicon carbide when treated with hydrofluoric acid.
Figure 22:
FIG. 22 shows no clumping of silicon carbide when treated with hydrofluoric acid.

The cleaning process also provides for an unexpected benefit. The uncleaned samples of silicon carbide granules were activated or energized in that they did not hold still during the tests due to their positive zeta potential. As a result, the uncleaned samples of silicon carbide granules would clump or cling together. The cleaned samples of silicon carbide granules, however, held still and no clumping or clinging together was observed. Examples of non-treated silicon carbide showing clumping are illustrated within FIGS. 19 and 20. Examples of silicon carbide treated with hydrofluoric acid showing no clumping and continuous flow are illustrated within FIGS. 21 and 22.

After cleaning with multiple rinses of water, cleaned and uncleaned silicon carbide granules were mixed into gels. During mixing (hand stirring with a stick followed by exposure to sonic vibrations), it was noted that the uncleaned gel would cling to the stick, so much so that the material would follow the stick as the stick was removed from the gel. Raising the stick an inch or more above the surface resulted in a silicon carbide gel trail which followed the movement of the stick. The silicon carbide gel did not drop off the stick like an ordinary liquid. Without being bound to any particular theory, it is believed that this feature of the gel is due to the positive zeta potential present within the composition of the gel which results in an electrical attraction forces within the gel composition itself. In contrast, the gel prepared with the cleaned silicon carbide did not cling or clump together and did not follow the stick. Eliminating silicon carbide's property to clump will have great benefit to the gel casting process. Clumping in the gel has been accounted for by raising the pH level of the gel to above 11.5 to keep the silicon carbide from clumping due to its zeta potential. However, raising the pH levels does not eliminate all clumping. A non-limiting example of a compound which may be used to raise the pH of the silicon carbide gel is tetramethylammonium which tends to gas out over time resulting in foaming of the gel. Cleaned samples of silicon carbide gel with a pH of 4.5 have been shown to barely clump at all compared to uncleaned samples having tetramethylammonium added. For example, tests were performed on unclean silicon carbide gels having a pH over 12 and electrical attraction or clumping within the composition of the gel was still very apparent. This is illustrated within FIGS. 19 and 20.

One novel additional step incorporated into the gel-casting process described above is to further compact the silicon carbide granules by applying vibratory forces. Such vibratory forces may include application of a pulsating electric current and ultrasonic vibrations. The irregular shape of silicon carbide grains inhibits sintering due to the relatively small contact surface area compared to other ceramics. In certain embodiments, applying vibratory forces to compact the grains may achieve a particle size of approximately one micron (0.000001 m), although other compaction ratios and contact areas are also encompassed within the disclosed process. Such vibratory action packs the fine grains into a coarse grain structure of melted/fused grains. In one embodiment, the vibratory forces (e.g., a pulsating electric current and/or ultrasonic vibrations) are applied during the initial mixing stage of the powder, water, dispersant and monomers. In another embodiment, the vibratory forces (e.g., a pulsating electric current and/or ultrasonic vibrations) are applied during a de-airing step to drive air out. Without being bound to any particular theory, it is believed that de-airing assists in orientating the silicon carbide particles to each other. During the de-airing step, a vacuum or pressure may also be applied in addition to the application of the vibratory forces. In yet another embodiment, the vibratory forces (e.g., a pulsating electric current and/or ultrasonic vibrations) are applied while the catalyst is added. In one embodiment, vibratory forces (e.g., a pulsating electric current and/or ultrasonic vibrations) are applied while the ceramic slurry is cured into a gel inside the mold. In one embodiment, low pressure (under about 6895 kPa or about 1000 psi) will be applied to the mold during vibration to drive air out. This is in contrast to conventional sintering processes which typically apply 68,958 to 137,895 kPa (10,000 to 20,000 psi) without the application of vibratory forces. In yet other embodiments, vibratory forces (e.g., a pulsating electric current and/or ultrasonic vibrations) are applied during every step of the gel-casting process, or in various combinations of the steps recited as parts of the process. An ultrasonic wand may be utilized to produce the ultrasonic vibrations. In some embodiments, an ultrasonic wand is introduced into the slurry to produce the desirable amount of vibrations. In other embodiments, well known in the art, other means for applying ultrasonic vibrations can be used.

Sintering Within a Capped Graphite Crucible

When the dried and pre-sintered casts are ready, they are loaded into a crucible of a molten bath and the crucible is capped with a piston. Light constant pressure is applied to the piston. As the piston presses down on the molten bath, air is vented from the bath and the casting. The pressure on the cap is maintained and the piston pushes further into the melt as the air escapes. The clearance between the piston and the crucible may range from about 15 thousandths of an inch (0.381 mm) to about 3-4 thousandths of an inch (about 0.0762 to about 0.1016 mm).

Air will escape from a viscous fluid by adding a relatively small amount of pressure. The air, in the now plastic (because of its temperature) silicon carbide grains push through the casting into the molten bath and out the vented piston. The momentary microscopic expansion caused by the cycling electricity causes the push for the air to be displaced. The silicon carbide grains themselves are displaced into each other as the air leaves during plastic deformation of the silicon carbide. The viscosity of the molten bath is such that it will not flow past a fairly large (over 0.002 inch) vent. Thus, the air can be squeezed out of the crucible while the bath remains. Also, there is no intrusion of the bath into the initially porous surface of the silicon carbide castings.

Induction Heating the Crucible

FIGS. 4 through 14 and 16-18 illustrate an exemplary, non-limiting apparatus which may be used to induction heat a crucible containing molten liquid for purposes of sintering silicon carbide and other materials.

An induction heater (100) is used to cause a radio frequency current to flow around a graphite crucible (136). The crucible (136) is mounted in a heat resistant vessel (104) and crucible support (102) for safety. In certain embodiments the vessel (104) comprises a ceramic lined pot which is capable of maintaining an inert atmosphere. In certain embodiments, the inert atmosphere is provided by a nitrogen supply tank (118). The crucible (136) is also grounded to the entire apparatus or support frame (106). A molten bath is maintained within the crucible (136) itself. Temperatures in excess of 2000° C. are easily created and maintained in the bath. Graphite can sustain temperatures in excess of 4000° C. but becomes fuel in the presence of oxygen when it is above 900° F. To prevent the graphite from being consumed as fuel, the vessel (104) can be covered to maintain a nitrogen gas atmosphere around the crucible (136). The nitrogen gas atmosphere may be provided by a nitrogen supply tank (118) capable of maintaining an inert atmosphere. The crucible (136) itself may be a simple cup which can be easily and cheaply replaced as the outside erodes during the sintering process. A strengthened crucible (136) which includes a wound graphite fiber and which may include a zirconium dioxide coating may be used.

The graphite crucible cap (108) has two functions. First, it is used as a piston to displace air from the crucible (136) and the gel casting. As the piston presses down on the molten bath, air is displaced and vented from the bath. Second, it can be designed in such a way that it has a graphite electrode (or electrodes) that are electrically insulated from the rest of the apparatus. This can be accomplished by casting zirconium dioxide (128) around the graphite center of a graphite piston (108) or cup. The result is a graphite piston (108) comprising a graphite core inside a zirconium insulator. In certain embodiments, the piston (108) is centered exactly over the crucible (136) and is held in alignment by the support frame (106) and (122). This can be achieved through a simple steel framework (106) and (122) that can hold an air or hydraulic piston above the crucible. The graphite electrode crucible cap or piston (108) is connected to a hydraulic cylinder or hollow ram (112) and may have a hole through its center. A collet holder (114) may be fixed to one end of the piston. A conductive or hollow rod (116) consisting of a cap, piston and an electrode on one end may be fed in place with the collet (114). The conductive or hollow rod (116) can conduct power originating from an electrical power source (120) down to the graphite electrode through the center of the hydraulic cylinder (112) and clamped in place with the collet (114). A non-limiting example of an electrical power source may be a DC current arc welder. In certain embodiments, the inner conductive or hollow rod (116) is made of brass although the inner conductive or hollow rod (116) may be manufactured from any material that is electrically conductive. The conductive or hollow rod (116) may be threadably engaged to the graphite electrode. The conductive or hollow rod (116) insulated from the rest of the piston/electrode assembly may be used to transfer electrical flow to the graphite electrode at the end of the graphite piston (108). A nitrogen feed line (138) which feeds nitrogen gas originating from the nitrogen tank (118) may terminate adjacent to the end of the graphite piston (108) as it is capped over the crucible (136) at a nitrogen nozzle (126). In certain embodiments, an electrode conducts current inside the radio frequency field created by the conductive or hollow rod (116). Thus, electric current can flow down the conductive or hollow rod (116) through the graphite electrode crucible cap (108) and into the molten bath in the crucible (136). In certain embodiments, the vessel (104) or crucible support (102) may impede radio frequency flow to the apparatus. Accordingly, in certain embodiments a radio frequency reflector (124) may line the interior of the vessel (104).

Figure 17:
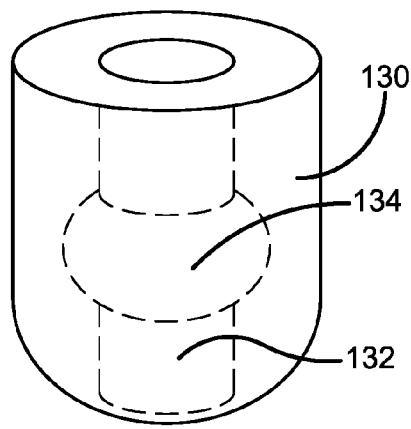
FIG. 17 is a perspective view of an exemplary part produced by the disclosed method.
Figure 18A:
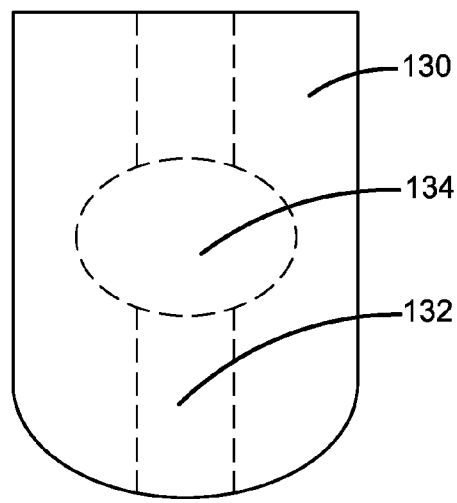
FIGS. 18a and 18b illustrate a cross-sectional view of the part of FIG. 17.
Figure 18B:
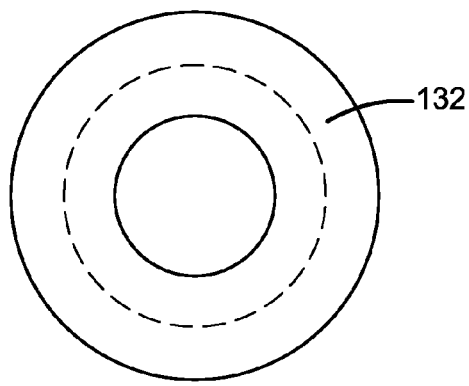

FIGS. 17 and 18 illustrate an exemplary silicon carbide part (130) manufactured according to the disclosed process and apparatus. The silicon carbide part (130) includes hollow core (132) which is created during the gel casting process with a wax which is burnt out during the drying and sintering process. In certain embodiments, the hollow core (132) may include a ball shaped portion (134) positioned within the center of the interior of the silicon carbide part (130).

Composition of the Molten Bath

The composition of the molten bath may be designed to carry out several functions. In certain embodiments, the molten bath is molten at sintering temperatures without boiling. It may also be electrically conductive. The molten bath may also be capable of being removed from the sintered gel castings, including the outside and anywhere within its cored areas. Fluorite has been chosen and tested for the molten bath but other materials will work. Fluorite is a glass like salt that is nonconductive when cold, but at sintering temperatures, it is slightly conductive. It melts at 1450° C. and boils at 2500° C. It is a stable liquid at 2000° C. and has no reaction with silicone carbide, but does react with silicon and silicon dioxide. Quenched in water when hot, fluorite shatters into grains so it can be cleaned off and out of the silicon carbide casts (quenching the silicon carbide in water has no effect on the silicon carbide itself). The fluorite can then be dried and reused. When it is at sintering temperature a pulsing or cycling electric current will flow through it. The current flow does not interfere with the radio frequency field created by the induction heater. The current also excites the bath and raises the temperature above even what the coil of the induction heater does. The temperature of the process can be safely sustained for long periods with little or no pressure making it a safer sintering process than that which is currently being used in ceramic processing. Capital investment for production processing is greatly reduced. The timing and current of electrical flow in the bath can be tailored to the optimum needs of the casting shapes and sizes.

Silicon Carbide Grain Sizes

The present method encompasses the use of larger grain sizes of silicon carbide. The smaller surface area of large grains means that much less surface area needs to be diffused within the silicon carbide casting. Tests have shown that coarser grained sintered silicon carbide is much stronger than fine-grained. Fewer inner particle diffusions means the grain size of the silicon carbide will be less likely to degrade into smaller grains which have reduced physical properties. Also, extremely large grains of silicon carbide can be partially sintered leaving a porous casting that can be used as a high temperature filter or as a fuel diffuser which is capable of retaining an air/fuel mixture within the interior of the porous silicon carbide part. In certain embodiments, the fuel diffuser is capable of diffusing the retained air/fuel mixture outside of the porous casting for combustion.

Uniform Compaction of the Green Body

The disclosed method is capable of applying a substantially uniform pressure on all surfaces of the green body through the liquid bath. This allows for uniform compaction of an irregular or hollow shape of the green body. Uniform wall thickness and hollow cores have uniform shrinkage and create less internal stress when sintering or when used in operation. Thick sections don't sinter well and thick to thin sections create stress points. Hollow cores can be filled with materials that compliment silicon carbide's properties. No pressing tooling is necessary according to the disclosed method and compaction can be fully achieved with simple pressure waves induced into the liquid bath within the enclosed chamber.

Numerous embodiments have been described herein. It will be apparent to those skilled in the art that the above methods and apparatuses may incorporate changes, modifications, and re-arrangements and additions of parts widely recognized as necessary or conventional in the art of ceramics casting, without departing from the general scope of this invention. It is intended to include all such modifications and alterations in so far as they come within the scope of the appended claims or the equivalents thereof.

What is claimed is:

1. A process for sintering silicon carbide comprising:
   a.) providing a silicon carbide powder of silicon carbide granules;
   b.) purifying the silicon carbide powder by
      b. 1.) washing the silicon carbide powder with a solution of hydrofluoric acid,
      b. 2.) rinsing the silicon carbide powder in distilled water; and
      b. 3.) drying the silicon carbide powder to obtain a purified silicon carbide powder,
   wherein granules which form the purified silicon carbide powder are substantially free of a silicon dioxide shell; and
   c.) subjecting the purified silicon carbide powder to a gel-casting process comprising the following steps:
      c. 1.) mixing the purified silicon carbide powder with water or a non-aqueous solvent, a dispersant, and gel-forming organic monomers to obtain a ceramic slurry;

c. 2.) exposing the ceramic slurry to a partial vacuum to remove air from the ceramic slurry;

c. 3) adding a polymerization initiator to the ceramic slurry to commence a gelforming chemical reaction;

c. 4) pouring the ceramic slurry into a mold and casting the ceramic slurry into a desired workpiece shape; and c. 5) heating the mold in a curing oven or setting the mold with a catalyst;

d.) removing a gel-cast part from the mold;

e.) drying the gel-cast part to remove the water or the non-aqueous solvent and obtain a dried cast ceramic part;

f) placing the dried cast ceramic part in a chamber of a graphite crucible, wherein the graphite crucible is coated with investment ceramic, wherein the dried cast ceramic part is suspended within the crucible in a compacted powder that is packed and vibrated to compact the powder around the dried cast ceramic part, and wherein the graphite crucible is capped to contain the compacted powder and to press out air from the chamber;

g.) placing the graphite crucible in an oven heated to about 1000° F. and feeding an air bleed into the capped graphite crucible to remove or burn out any gel binding material remaining in the ceramic;

h.) maintaining the applied heat to the graphite crucible until oxygen precipitates through the compacted powder and the silicon carbide is suspended in the compacted powder;

i.) heating the graphite crucible to a temperature below 1450° C. to begin to sinter the silicon carbide while it is held in situ by the compacted powder, wherein the dried cast ceramic part begins to be sintered within the capped crucible allowing the casting to lightly bond to itself; and j.) sintering the dried cast ceramic part at temperatures from about 1600° C. to less than about 2200° C., wherein sintering allows the compacted powder to be heated to a liquid or molten state, wherein the dried cast ceramic part is sintered within the pressurized capped crucible of molten liquid and wherein vibratory forces are applied to the molten liquid.

2. The process of claim 1, wherein ultrasonic vibrations are applied during step c. 4).

3. The process of claim 1, wherein ultrasonic vibrations are applied during step c. 5).

4. The process of claim 3, wherein the mold is subjected to a de-airing step during vibration of step c. 5) to drive air out and orientate the silicon carbide granules to each other.

5. The process of claim 4, wherein the de-airing step comprises application of low pressure to the mold, wherein the pressure is less than about 6895 kPa (1000 psi).

6. The process of claim 1, wherein ultrasonic vibrations are applied during step c. 1).

7. The process of claim 1, wherein ultrasonic vibrations are applied during step c. 2).

8. The process of claim 1, wherein ultrasonic vibrations are applied during steps b.), c.1), c.2), c. 4), and c. 5).

9. The process of claim 1, wherein vibratory forces are applied to the dried cast ceramic part during step j.).

10. The process of claim 9, wherein the dried cast ceramic part is heated within the capped graphite crucible containing the molten liquid through induction heating.

11. The process of claim 10, wherein the vibratory forces are applied to the dried cast ceramic part through application of a pulsating electric current to the molten liquid.

12. The process of claim 11, wherein the vibratory forces compact the silicon carbide granules to achieve a particle size of approximately one micron.

13. The process of claim 11, wherein the molten liquid is conductive.

14. The process of claim 13, wherein the compacted powder and molten liquid are fluorite.

15. The process of claim 14, wherein the molten liquid is induction heated to a temperature ranging from about 1600° C. to about 2100° C.

16. The process of claim 15, wherein the dried cast ceramic part is cored during the gel-casting process of step c.) with a wax that will burnout during the drying and sintering process.

17. The process of claim 16, wherein the dried cast ceramic part is sufficiently vented to allow an influx of the molten liquid into chambers within the gel-cast part allowing pressure to be evenly distributed on every surface of the dried cast ceramic part for obtaining a hollow silicon carbide part.

18. The process of claim 17, wherein sintering takes place in a high carbon flame (rich fuel/air mixture) to facilitate the formation of silicon carbide.

19. The process of claim 18, wherein the hollow silicon carbide part is filled with urethane and para-aramid synthetic fibers.

20. The process of claim 18, wherein the hollow silicon carbide part is porous and may be used as a fuel diffuser which is capable of retaining an air/fuel mixture within the interior of silicon carbide part and of diffusing the retained air/fuel mixture outside of the porous silicon carbide part for combustion.

21. The process of claim 10, wherein the crucible is held within an inert atmosphere to keep from being consumed as fuel at sintering temperatures, wherein the inert atmosphere comprises nitrogen gas.

* * * * *